(12) United States Patent
Beckmann et al.

(10) Patent No.: US 7,277,765 B1
(45) Date of Patent: Oct. 2, 2007

(54) INTERACTIVE SOUND REPRODUCING

(75) Inventors: Paul E. Beckmann, Southborough, MA (US); Santiago Carvajal, West Newton, MA (US); Christopher H. Perry, Westborough, MA (US)

(73) Assignee: Bose Corporation, Framingham, MA (US)

( * ) Notice: Subject to any disclaimer, the term of this patent is extended or adjusted under 35 U.S.C. 154(b) by 602 days.

(21) Appl. No.: 09/689,337

(22) Filed: Oct. 12, 2000

(51) Int. Cl.
*G06F 17/00* (2006.01)
*G10L 21/00* (2006.01)
*G10H 1/00* (2006.01)

(52) U.S. Cl. .......................... 700/94; 704/272; 84/604

(58) Field of Classification Search ................. 700/94; 707/104.1; 704/270, 272, 278; 715/727; 84/600, 601, 602, 604
See application file for complete search history.

(56) References Cited

U.S. PATENT DOCUMENTS

| | | | |
|---|---|---|---|
| 4,825,209 A | 4/1989 | Sasaki et al. | |
| 5,204,768 A | 4/1993 | Tsakiris et al. | |
| 5,282,028 A | 1/1994 | Johnson et al. | |
| 5,283,819 A | 2/1994 | Glick et al. | |
| 5,410,326 A | 4/1995 | Goldstein | |
| 5,537,106 A | 7/1996 | Mitsuhashi | |
| 5,594,509 A | 1/1997 | Corey et al. | |
| 5,793,980 A | 8/1998 | Glaser et al. | |
| 5,864,868 A * | 1/1999 | Contois .................... | 707/104.1 |
| 5,870,710 A | 2/1999 | Ozawa et al. | |
| 5,956,025 A | 9/1999 | Goulden et al. | |
| 5,960,366 A | 9/1999 | Duwaer | |
| 5,969,283 A | 10/1999 | Doyle et al. | |
| 5,978,591 A | 11/1999 | Bartholomew et al. | |
| 6,007,228 A | 12/1999 | Agarwal et al. | |
| 6,008,777 A | 12/1999 | Yiu | |
| 6,118,450 A * | 9/2000 | Proehl et al. ................ | 715/810 |
| 6,122,749 A | 9/2000 | Gulick | |
| 6,127,941 A * | 10/2000 | Van Ryzin ............. | 340/825.69 |
| 6,131,130 A | 10/2000 | Van Ryzin | |
| 6,192,340 B1 | 2/2001 | Abecassis | |
| 6,248,946 B1 * | 6/2001 | Dwek .......................... | 84/609 |
| 6,356,971 B1 * | 3/2002 | Katz et al. ................... | 710/301 |
| 6,380,947 B1 * | 4/2002 | Stead ......................... | 345/645 |

(Continued)

FOREIGN PATENT DOCUMENTS

CN           1437197           8/2003

(Continued)

OTHER PUBLICATIONS http://pocketcalculatorshow.com/boombox/golden2.html, The Golden Age 1981-1985, pp. 1-6.
Official communication from India Patent Office regarding Application No. 881/MUM2001.

*Primary Examiner*—Xu Mei
(74) *Attorney, Agent, or Firm*—Fish & Richardson P.C.

(57) ABSTRACT

An audio system attachable to a computer includes a sound reproduction device for producing audible sound from audio signals. The sound reproduction device includes a radio tuner and a powered speaker. The audio system further includes a connector for connecting the sound reproduction device with a computer. The computer provides audio signals from a plurality of sources, the sources including a computer CD player, digitally encoded computer files stored on the computer, and a computer network connected to the computer. The sound reproduction device further includes control buttons for controlling at least one of the computer CD player, the digitally encoded computer files and the computer network.

43 Claims, 33 Drawing Sheets

U.S. PATENT DOCUMENTS

| | | |
|---|---|---|
| 6,510,210 B1 | 1/2003 | Baughan |
| 6,734,882 B1 | 5/2004 | Becker |
| 6,754,468 B1 | 6/2004 | Sieben et al. |
| 6,772,212 B1 | 8/2004 | Lau et al. |
| 6,813,528 B1 | 11/2004 | Yang |
| 6,879,865 B1 * | 4/2005 | Gladwin et al. ............... 700/94 |
| 6,959,221 B1 * | 10/2005 | Kataoka ...................... 700/94 |
| 2002/0029303 A1 | 3/2002 | Nguyen |
| 2005/0049002 A1 | 3/2005 | White et al. |

FOREIGN PATENT DOCUMENTS

| | | |
|---|---|---|
| DE | 30 40 465 | 6/1982 |
| EP | 0 301 770 | 2/1989 |
| EP | 0 455 821 | 11/1991 |
| EP | 0542 345 | 5/1993 |
| EP | 0744839 | 11/1996 |
| GB | 2064905 | 6/1981 |
| JP | 3-105782 | 5/1991 |
| JP | 6-311587 | 11/1994 |
| JP | 8-298440 | 11/1996 |
| JP | 9-102719 | 4/1997 |
| JP | 11-168674 | 6/1999 |
| JP | 2000-20056 | 1/2000 |
| WO | WO 00/27681 A | 6/1999 |
| WO | WO 00/27117 A | 5/2000 |
| WO | WO 00/42766 | 7/2000 |

* cited by examiner

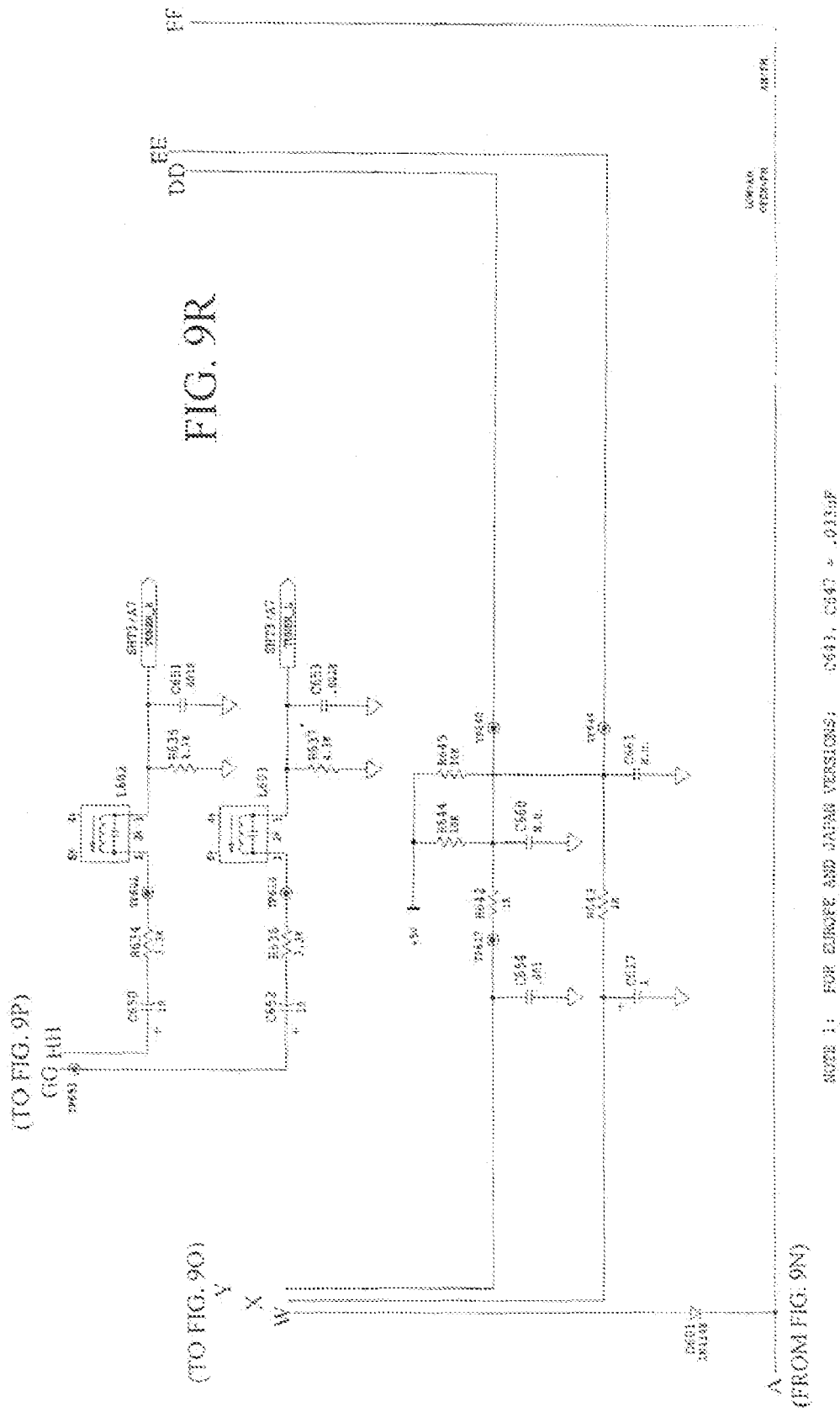

INTERACTIVE SOUND REPRODUCING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to interactive sound reproducing and more particularly to sound reproducing from computer compact disk (CD) drives, network radio stations, broadcast radio stations, and digitally encoded computer files.

It is an important object of the invention to provide improved interactive sound reproducing.

BRIEF SUMMARY OF THE INVENTION

According to the invention, an audio system includes a sound reproduction device for producing audible sound from audio signals. The sound reproduction device includes a radio tuner, a powered speaker and a connector for connecting the sound reproduction device with a computer. The computer provides audio signals from a plurality of sources. The sources include a computer CD player, digitally encoded computer files stored on the computer, and a computer network connected to the computer. The sound reproduction device includes control buttons for controlling at least one of the computer CD player, the digitally encoded computer files and the computer network.

In another aspect of the invention, an audio system includes a sound reproduction device for producing audible sound from audio signals. The sound reproduction device includes an enclosure, enclosing a radio tuner and a powered speaker. The audio system further includes a connector for connecting the sound reproduction device with a computer, the computer for providing audio signals from a computer CD player, from digitally encoded computer files, and from a computer network.

In another aspect of the invention, an audio system includes a sound reproduction device for reproducing audible sound from audio signals, a computer coupled to the sound reproduction device for receiving the audio signals from a computer network, the audio signals being transmitted from an alternatively selectable plurality of network addresses, and a remote control device, for communicating commands to the sound reproduction device, the remote control device comprising a plurality of indicator buttons. An indicating one of the indicator buttons causes the computer to select a preassigned one of the network addresses.

In another aspect of the invention, an audio system includes a computer system and a sound reproduction system for reproducing audible sound from audio signals. The audio signals come from a plurality of selectable sources. A method for switching the sound reproduction system from an unpowered state to a powered state includes transmitting a control signal from the sound reproduction system to the computer system. If the computer system responds to the control signal, the method determining by the sound reproduction device that the computer system is in a responsive state and If the computer system does not respond to the control signal, determining by the sound reproduction device that the computer system in an unresponsive state.

In another aspect of the invention, a radio receiver has a number n of preset indicators. A method for assigning broadcast frequencies to individual preset indicators includes determining the location of the radio receiver and scanning the frequency spectrum to determine the strongest signals.

In another aspect of the invention, a sound system includes a sound reproduction device coupled to a computer system and a remote control device, for transmitting encoded control commands to the sound reproduction device. A method for decoding the commands includes receiving, by the sound reproduction device, one of the encoded control commands, and decoding, by the sound reproduction device, the one received control command, and executing, by the sound reproduction device, the one received control command. In the event that the one received control command is not decodable or is not executable by the sound reproduction device, the method includes transmitting the encoded control command to the computer system.

In another aspect of the invention, an audio system includes a sound reproduction device for reproducing audible sound from audio signals from a plurality of sources. The sources including a radio tuner and at least one of a CD containing a plurality of individually indicatable tracks, a plurality of individually indicatable network addresses, and a plurality of individually indicatable digitally encoded files stored on a digital storage device. The audio system includes a source selector for selecting from the plurality of sources, a source of audio signals to be reproduced by the sound reproduction device and a control signal input device. If the selected source is the radio tuner, an activation of the control signal input device changes the tuning frequency of the radio tuner; if the selected source is the CD, an activation of the control signal input device changes the indicated CD track or play position within a track; and if the selected source is the selectable network addresses, an activation of the control signal device changes the indicated network address.

In another aspect of the invention, a method of operating an audio system adapted to reproduce sound from a plurality of digitally encoded files which contain identifying characteristics includes assigning a value of one of the identifying characteristics to a preset indicator; on the indicating of the preset indicator, searching the plurality of files for the value of the one identifying characteristic; and selecting for reproduction the digitally encoded files having the value.

In still another aspect of the invention, a method for selecting from a plurality of audio signal sources having identifying characteristics, a single audio signal source, includes specifying a value of one of the identifying characteristics; determining, by a computer, which of the audio signal sources have the value for the one characteristic; and selecting a single audio source from the plurality of audio signal sources.

According to another aspect of the invention, a method gives multiple sets of values to a single set of presets being used with a single source. The method changes the set of values by clicking on a graphic, such as a right or left arrow on the screen display, to bring up a new set of values for the presets. Typically, any one of the set of values is selectable by either clicking with the pointing device on the appropriate preset on the screen, pressing the selected preset on the remote, or pressing the preset on the radio.

Other features, objects, and advantages will become apparent from the following detailed description, which refers to the following drawings in which:

DETAILED DESCRIPTION OF THE INVENTION

Figure 1:
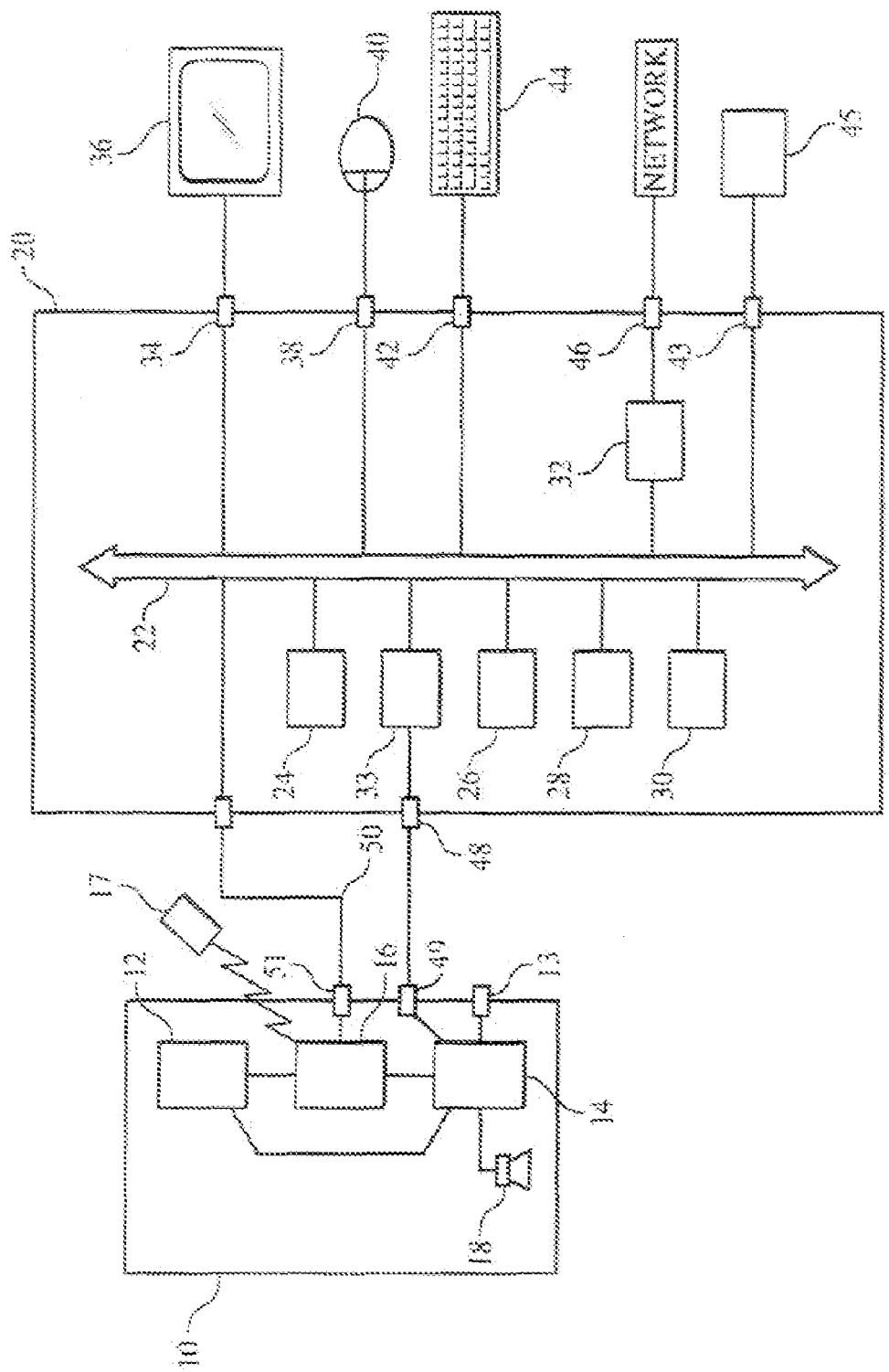
FIG. 1 is a block diagram of a first configuration of a networked sound system according to the invention.

With reference now to the drawings and more particularly to FIG. 1, there is shown a first configuration of a networked sound system according to the invention. Sound reproduction device 10 includes an AM/FM tuner 12, audio signal processing circuitry 14, control electronics circuitry 16 for controlling the tuner and signal processing circuitry, a remote control device 17 for communicating commands to control electronics circuitry 16, and an electroacoustical transducer 18. An auxiliary (hereinafter "aux") input 13 typically implemented as a signal jack permits the sound reproduction device to receive audio signals from outside sources, such as portable CD players. Computer system (PC) 20 includes a bus 22 which interconnects various computer system components and carries data and control signals between them. Hardware components may include CPU 24, RAM 26, CD player 28, a mass storage device, such as a hard disk 30, a network interface card 32, and a sound card 33. Computer system 20 also includes a number of external connectors for connecting bus 22 with various external devices. A first external connector 34 connects to an external display 36. A second external connector 38 connects to an external input device such as a mouse 40. A third external connector 42 connects to a keyboard 44. A fourth external connector 46 connects network interface card 32 to a local or wide area network for transmitting to and receiving signals from remote devices that are connected to the local or wide area network. A fifth external connector 43 connects to external mass storage device 45. Stereo jack 48 connects sound card 33 to radio audio signal processing circuitry 14 through analog input terminal 49. Audio system control connector 50 connects bus 22 to control electronics circuitry 16 through digital input terminal 51.

Figure 2:
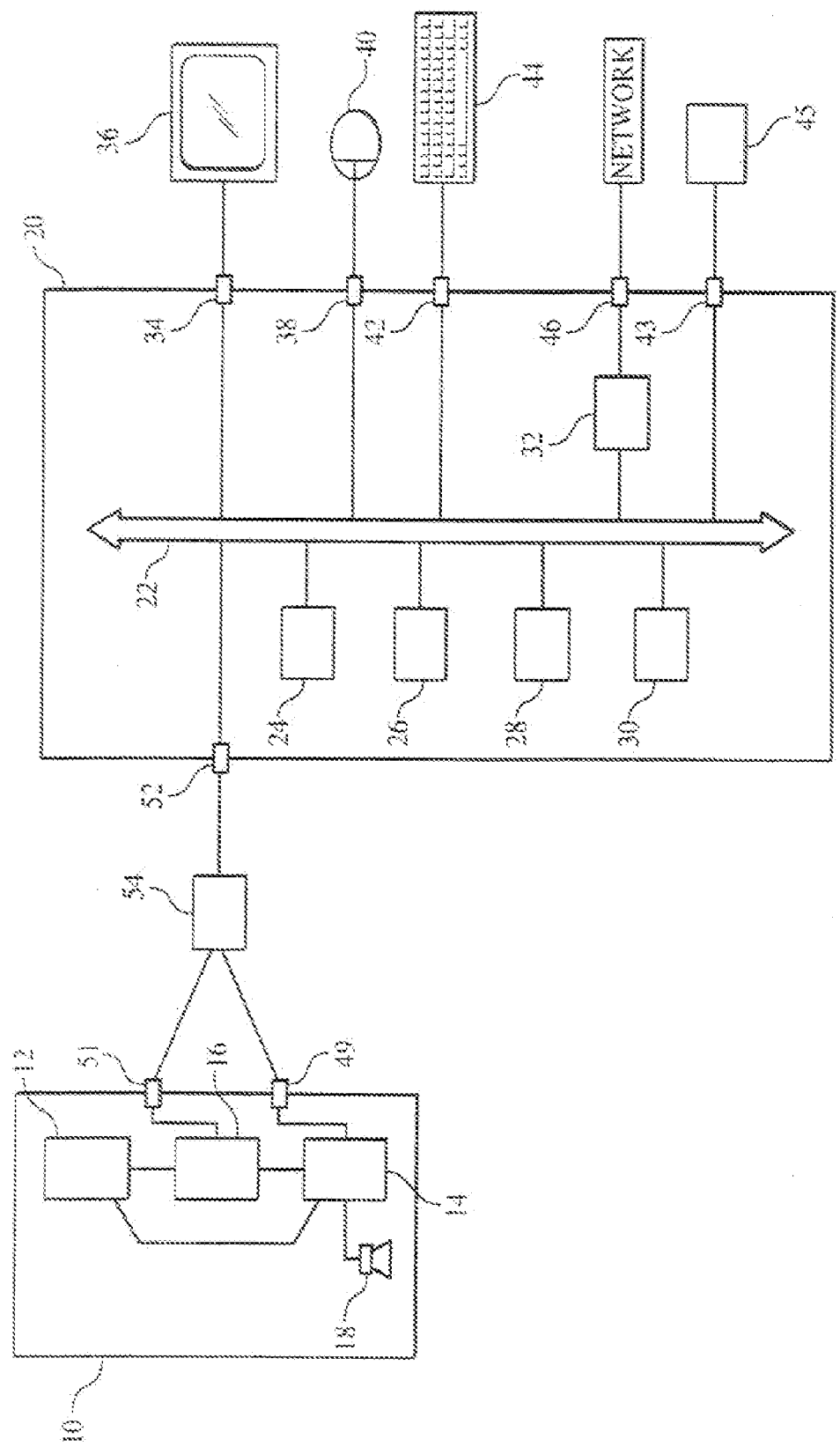
FIG. 2 is a block diagram of a second configuration of a networked sound system according to the invention.

Referring now to FIG. 2, there is shown a second configuration of a networked audio system according to the invention. The elements of FIG. 2 are the same as the elements of FIG. 1, with some exceptions. Sound card 33 of FIG. 1 is not needed in this configuration. Stereo jack 48 and the audio system control connector 50 of FIG. 1 are replaced by a bus interface connector 52, which connects to an interface unit 54. The interface unit 54 connects to audio signal processing circuitry 14 through analog terminal 49 and to control electronics circuitry 16 through digital terminal 51. Interface unit 54 will be described in more detail in connection with a subsequent figure.

A networked audio system which contains both the powered speaker and the radio tuner in a single enclosure is advantageous over conventional audio systems which house the speakers and radio tuner in separate enclosures, because the system can then be configured to occupy less space in a work area.

Figure 3:
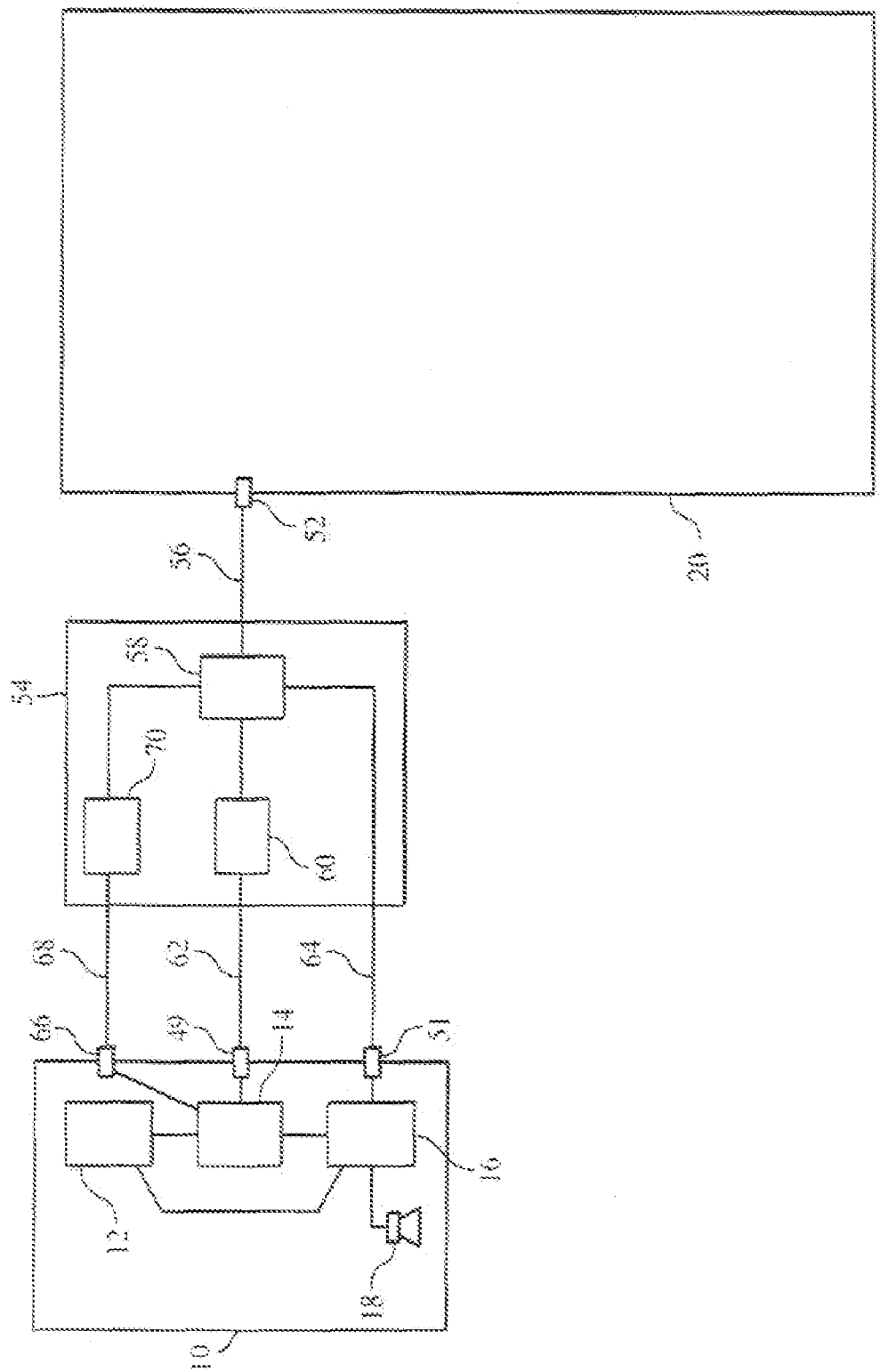
FIG. 3 is a block diagram of the interface unit of FIGS. 1 and 2.

Referring to FIG. 3, there is shown interface unit 54 in more detail. Signal line 56 from interface connector 52 is connected to logic circuitry 58. Logic circuitry 58 is coupled to D/A converter 60 which is connected to analog terminal 49 by analog signal line 62. Analog terminal 49 is in turn connected to audio signal processing circuitry 14. Logic circuitry 58 is connected to digital terminal 51 by digital signal line 64. Digital terminal 51 is in turn connected to control electronics circuitry 16. If bi-directional flow of analog signals is desired, a second analog signal path is provided. The second analog signal path includes a signal line between audio signal processing circuitry 14 and a second analog terminal 66; a second analog signal line 68 connecting second analog terminal 66 and an A/D converter 70; and a signal line connecting A/D converter 70 and logic circuitry 58.

In operation, logic circuitry 58 determines if transmissions on signal line 56 from bus 22 are intended for sound reproduction device 10. If signals on bus 22 are intended for sound reproduction device 10, logic circuitry 58 determines whether the signals are control signals or audio information. If the signals are control signals, logic circuitry 58 transmits signals to digital terminal 51 over digital signal line 64. If signals are audio information, logic circuitry transmits signals to D/A converter 60 which converts the digital signal to an analog audio signal. Analog audio signal is then transmitted over analog signal line 62 to analog terminal 49 and then to audio signal processing circuitry 14. The digital signal path including control circuitry 16, digital terminal 51, digital signal line 64, logic circuitry 58 signal line 56, and interface connector 52 is constructed and arranged to transmit signals bidirectionally, so that control signals originating at control circuitry 16 can be transmitted to computer bus 22 for processing by CPU 24. If bidirectional flow of analog circuitry is desired, analog signals may be transmitted from audio signal processing circuitry 14 to second analog terminal 66, and to A/D converter 70, where it is converted to a digital signal that is then transmitted to logic circuitry 58.

In one implementation, sound reproduction device 10 is a Wave® radio equipped with an appropriate communications ports, available from the Bose Corporation of Framingham, Mass. Computer system 20 may be a conventional multimedia personal computer.

There are typically three implementation arrangements for interface unit 54. One alternative is to implement interface unit 54 as a module in computer system 10. In this arrangement, interface unit 54 is implemented as a circuit board that connects internally to bus 22 (so that interface connector 52 is internal to the computer, and is physically connected to an expansion slot in the computer), signal lines 62, 64, and 68 are implemented as cables, and digital terminal 51, analog terminal 49 (and second analog terminal 66, if present) are external ports for the sound reproduction device 10.

A second alternative is to implement interface unit 54 as an intermediate, separate unit, typically integrated with cables which implement signal lines 62, 64, 68, and 56. In this arrangement, interface connector 52 is an external computer port, and digital terminal 51, analog terminal 49 (and second analog terminal 66, if present) are external ports for the sound reproduction device 10.

A third alternative is to implement interface unit 54 as a module, such as a circuit board, in the sound reproduction device 10. In this arrangement, sound reproduction device 10 has an external port to accommodate a cable that implements signal line 56, and the remaining signal lines and terminals are internal to sound reproduction device 10.

A networked sound system according to the invention may have a number of operating modes. In a first mode, sound reproduction device 10 operates as a standalone sound reproduction device (hereinafter "standalone mode"), similar to a conventional radio or hi-fi receiver. Operating in this mode, sound reproduction device operates independently of computer system 20, and even operates if computer system 20 is not running. In a second operating mode (hereinafter "sound effects mode"), sound reproduction device 10 operates as conventional computer speakers, reproducing sounds that are incidental to programs running on computer system 20. Examples may be sound effects in computer games, audible alarms and warnings, indicating, for example, that the computer system has received electronic mail. In a third operating mode (hereinafter "audio system mode") sound reproduction device 10 operates as a processor and reproducer of audio signals from a variety of sources, including networked sources and components of the computer system 20.

When the system is operating in the sound effects mode and the audio systems mode, the operation of the components of the system is controlled by a software program running on computer system 20. For efficient use of computer resources, the software program may be divided into two program modules, one of which provides communications between components of computer system 20 and sound reproduction device 10, and a second which accesses sound sources as described below. Additionally, the first program module can contain instructions such that it automatically activates the second program module if it detects a communication from sound reproduction device 10 to computer system 20 that requires that the second module be running.

Operating in standalone mode, sound reproduction device 10 is controlled as, and operates as a standard radio or receiver. On/off, tuning, and volume control are all either entered by control buttons or dials that are connected electronically to control electronics circuitry 16, or by remote control device 17.

Operating in sound effects mode, sound reproduction device 10 is controlled as, and operates as, standard amplified computer speakers having an on/off switch and volume control.

Operating in audio systems mode, sound reproduction device 10 reproduces sound from tuner 12, aux input 13, digital audio signals stored in RAM 26, hard disk 30, or external mass storage device 45; audio signals received from sources connected to the local or wide area network connected to network interface 32; and other sources such as CD player 28 (which can be a component of computer system 20 as shown, or which can be a separate component, connected directly to sound reproduction device 10). The source or sources of the audio signals is controlled by a computer program running on computer system 20.

If sound reproduction device 10 is in the "off" state, and is turned "on" either by pressing the "on" or "power" button or a button or indicator performing an equivalent function, or by pressing the corresponding button on remote control device 17, control electronics circuitry 16 detects whether computer 20 is connected, and if connected, in the "on" or "off" state. If computer 20 is not connected or is in the "off" state, sound reproduction device 10 operates in standalone mode, and sound reproduction device begins reproducing audio signals from the last internal audio signal source (in one implementation, either AM or FM signals from AM/FM tuner 12, or signals from aux input 13). If computer 20 is in the "on" position and the second program module (as described above in the discussion of "Operating Modes") is not running, the first program module activates the second program module, and the sound reproduction device begins producing signals from the last audio signal source, as described above in the discussion of "audio systems mode." If computer 20 is in the "on" position and the second program module is running, the sound reproduction device begins producing signals from the last audio signal source.

Recorded on hard disk 30 or external mass storage 45 may be information about typically either AM broadcast, FM broadcast, broadcast radio stations available to the reproduction device 10 through tuner 12. Typically, availability is determined by a combination of proximity to and direction to the broadcast site, directionality and power of the broadcast signal, obstructions (such as tall buildings and mountains), and competing signals, especially those in nearby frequency bands. The list of radio stations available to the reproduction device may be assembled in a number of ways. In a simple form, the user may manually tune a radio station and manually enter into the data base identifying information about the radio station. In more sophisticated forms, the reproduction device may automatically scan the broadcast frequency spectrum and assemble a list of available radio stations by noting the frequency and by measuring signal strength of received signals, or a suggested list of radio stations, based on location information such as zip code, or can be compiled by a resource (such as the vendor of the reproduction device or a commercial information assembler). Information about each radio station can also be collected and stored. Such information can include: station broadcast frequency; station call letters and/or other identifiers; station format (news, type of music, location, and others).

Information about radio stations that are accessible over the local or wide area network (hereinafter web radio stations) is also acquired and stored. This information may be acquired through search engines, by commercially available listings from suppliers such as vTuner (vTuner.com), or assembled by the user. Information about web radio stations typically include a station identifier, a network address, a category (e.g. news, rock, jazz, sports, classical), and a location of origination.

The information about broadcast radio stations and web radio stations, respectively, may be organized and sorted based on any of the information types mentioned above.

In addition to reproducing sound, a networked sound system according to the invention can record, on hard disk 30 or external mass storage device 45. Recording can be done simultaneously with sound reproduction, or in the "background." Sound is recorded in units, and the units are identified and information about the units are recorded in a data base. For example, a typical recording unit is a track on a CD. The information about each unit (track) may include title, composer, artist, category (e.g. classical, rock, blues). The information may be obtained automatically or by user intervention from commercially available internet sources and/or may be entered or edited by the user. Additionally, for other types of recording units, the information may be of other types (such as for radio broadcasts a station and a time interval; for athletic events the date and participating teams; for cultural events the date, performer, composer; and others). For convenience, recorded units and assemblages of recorded units are referred to as "music files" even though the recorded units are not necessarily recordings of music.

Figure 4:
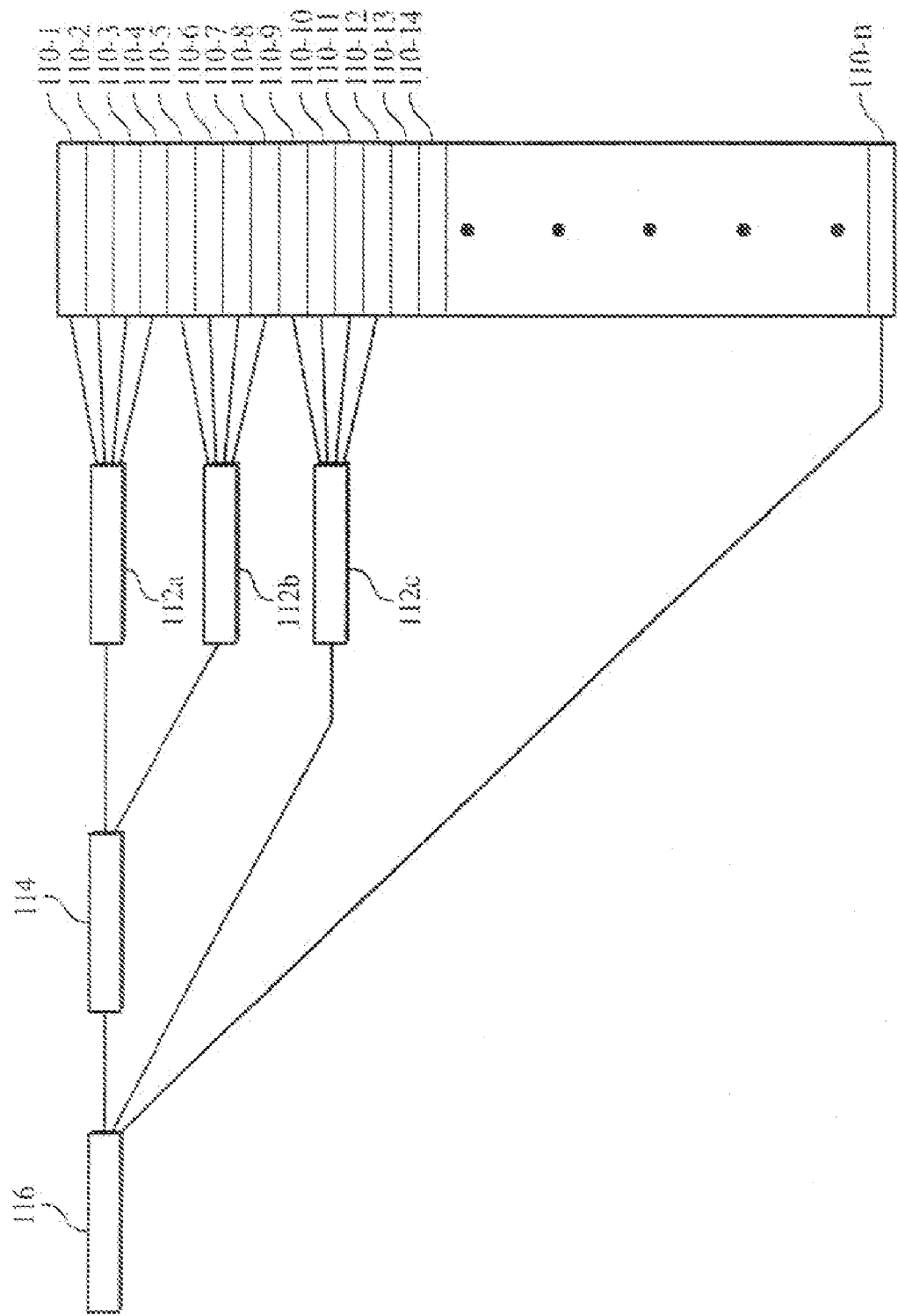
FIG. 4 is a diagram helpful in explaining the logical database relationships of recorded units and assemblages of recorded units.

Referring now to FIG. 4, there is shown a diagram that will be used to discuss the logical relationships of recorded units and assemblages of recorded units. Recorded units 110-1 through 110-n each contain data representing the recorded sound and information about the recorded sound. Information could include the artist, the composer, and the type of music. A first type of assemblage of recorded units is an "album" represented here as items 112a, 112b, 112c. Albums 112a, 112b, and 112c may also have associated with them information similar to the information about the recorded units, such as artist, composer, and type of music. Albums may include recorded units that have different composers, artists, or type of music.

A second type of assemblage includes recorded units with common identifying characteristics, sometimes referred to as common "metadata" values. "Metadata" values are typically included in file header information of music files in many popular music file formats. Metadata values may include the artist, the composer, the type of music, and others. For example, element 114 represents an assemblage that includes all albums (112a and 112b) that include a track performed by a predetermined artist and all tracks performed by that artist. Album 112b is included in the assemblage, even though it may include only one track 110-7 performed by that artist and even though that album may contain tracks that are performed by other artists. In other embodiments, the assemblage may be set up such that only tracks performed by the artist are included in the assemblage. Similarly, assemblage 114 may represent an assemblage of all recorded units written by a common composer or containing a common type of music.

For example, if an assemblage contains music files having a common composer metadata value of "Beethoven", each time the assemblage is requested, a computer database program may search all the music files for the metadata value of "Beethoven" as the composer. In this manner, each time a new music file is recorded with "Beethoven" as the composer, it is automatically added to the assemblage. In other words, this second type of assemblage may be said to be dynamically constructed.

A third type of assemblage is represented by playlist 116. In this example, playlist 116 includes artist assemblage 114, album 112c, and track 110-n.

Information about recorded units, playlists and other assemblages, broadcast radio stations, computer network accessible radio stations is stored in a data base stored in RAM 26 mass storage device 30 or external mass storage device 45. In one implementation, a record of the data base may correspond to a broadcast radio station, a web radio station, or a recorded unit. The fields of the records representing broadcast radio stations may contain information such as call letters, broadcast frequency, station format, or signal strength. The fields of record representing computer network accessible radio stations may include a identifiers, network addresses, locations, and station formats. The fields of record representing recorded units may include the metadata values as described above.

Figure 5:
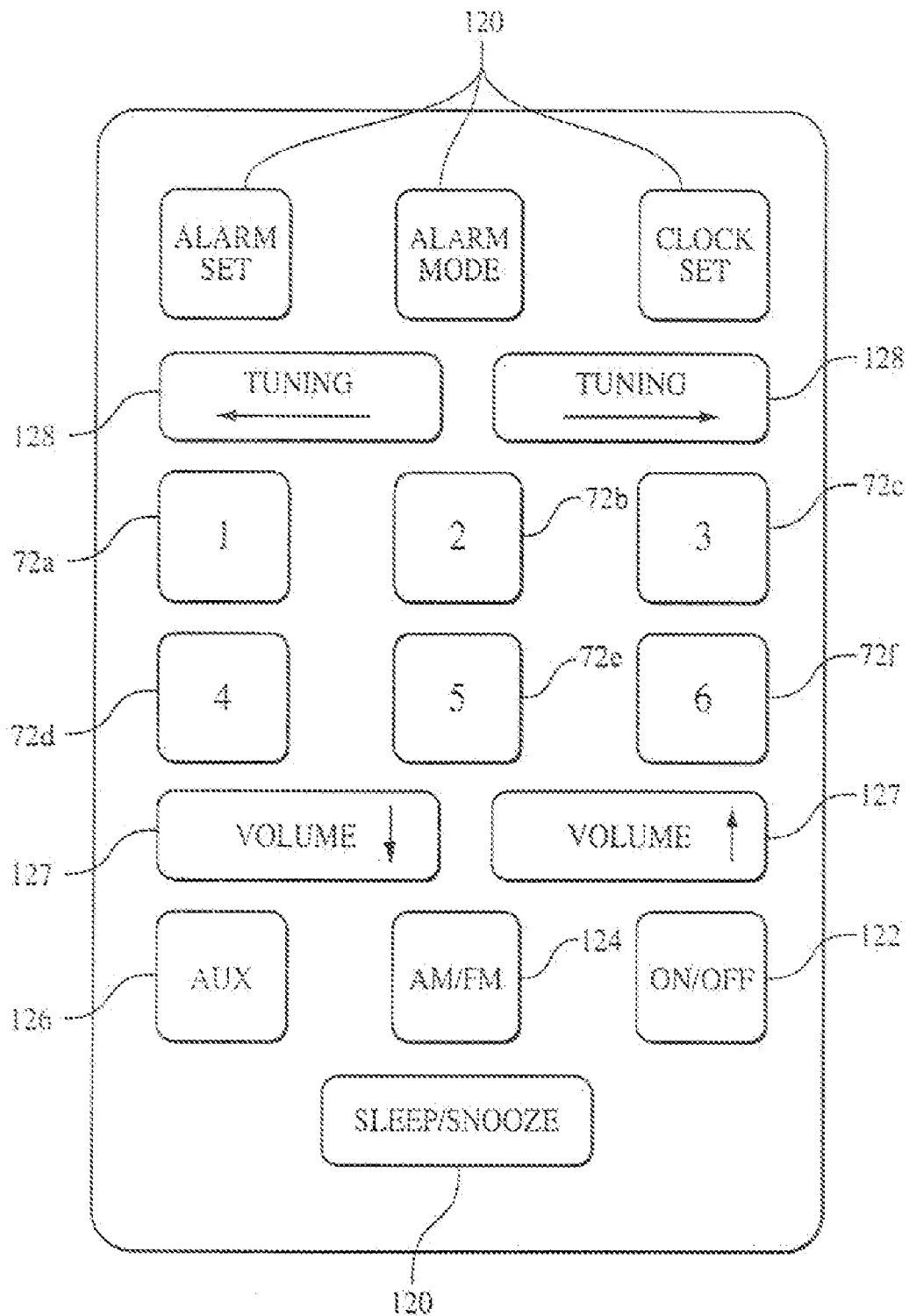
FIG. 5 is a sound reproduction device control panel according to the invention.

Referring to FIG. 5, there is shown a control panel from sound reproduction device 10. Preset buttons 72a–72f each have a broadcast frequency associated with it. When that button is depressed by the user, the control electronics circuitry causes the control electronics circuitry (of FIG. 1) to cause the tuner 12 to tune to the frequency associated with that preset button.

In addition to associating broadcast frequencies to the identifiers, a networked sound system according to the invention can assign other entities to the preset button. Other entities can include web radio network addresses, playlists; or recorded units, such as individual CD tracks, or other assemblages of recorded unit as described above.

Figure 6:
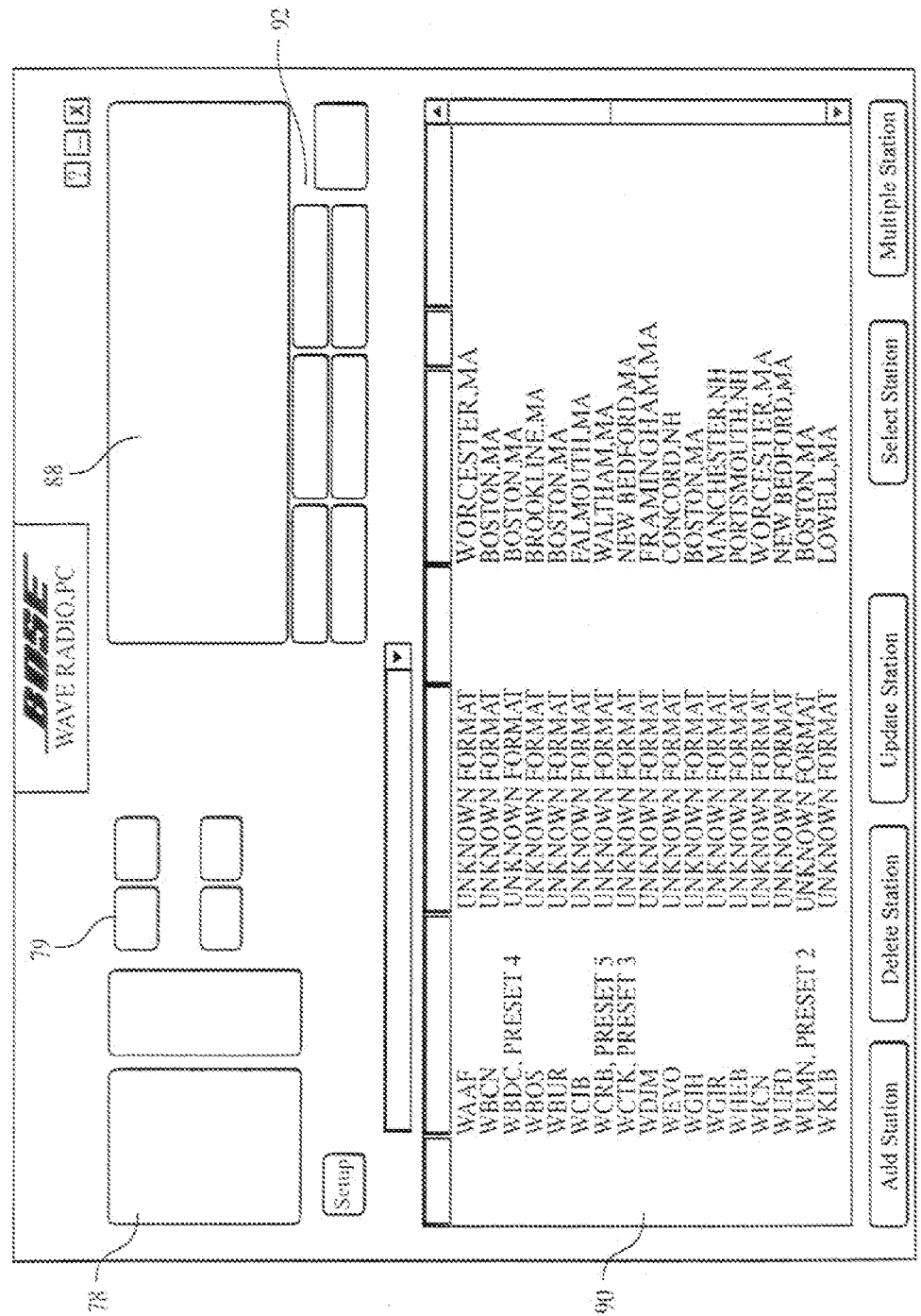
FIG. 6 is a representation of an interface screen on a computer display in accordance with the invention.

In a networked sound system according to the invention, there are at least three ways of activating the preset buttons. The buttons of FIG. 5 can be depressed; corresponding buttons on remote control device 17 can be depressed; or a graphical representation of a corresponding preset button that is caused to appear on external display 36 by a computer program may be selected by operation of mouse 40. Hereinafter, the term "preset indicator" will be used to denote the preset buttons on the control panel (FIG. 5), the preset buttons on the remote control device (FIG. 8), or the graphical representation of the preset buttons on the display (FIG. 6). In one embodiment, there is a one to one correspondence between the preset buttons on the control panel of the sound reproduction device, the preset buttons on remote control device 17, and the graphical representation of preset buttons appearing on external display 36. Activating a preset button on control panel of FIG. 5, the corresponding preset button on remote control device 17, or the graphical representation of the preset button on external display 36 causes the same entity to be selected. For each different source, a different entity may be assigned to each preset button, as will be described below. There may also be multiple sets of values to a single set of presets being used with a single source as discussed above. For example, there may be multiple sets of FM and/or AM radio stations.

A common user interface screen is caused to appear on external display, with some of the portions of the screen having different identifying legends. Referring to FIG. 6, there is shown a user interface screen. Source selection region 78 has graphical regions enabling the user to select the audio signal source. In this implementation, a CD, AM broadcast radio, FM broadcast radio, Web Radio, and Music Files (e.g. recorded units) can be selected. In current selection region 88, information about the selection currently displayed is shown. In available selections region 90, information about the available selections is shown. In preset section 92, six graphical figures, corresponding to the six preset buttons shown in FIG. 6 are displayed. "Tune" graphical FIG. 79 are discussed below in the discussion of FIG. 8.

The information displayed in the available selections region 90 may be ordered based on any of the metadata values. For example, the list of FM stations of FIG. 6 can be ordered in by station ID as shown, or could be ordered by broadcast frequency, or by category (station format). Ordering the list of stations in different manners enables the user to more easily select the music to be reproduced from the list of available selections, especially if the number of available selections is large. For example, if the user has selected "web radio"as the source, there may be hundreds of entries displayed in the available selections region. If the user wants to listen to a particular type of music, for example jazz, the user can order the list of available web radio stations by station format, and scroll through the list and listen to web radio stations until a suitable station is found. Scrolling through the list can be done by using the arrow keys on the computer keyboard, the "tuning" buttons 128 (FIG. 5) on the control panel, or the corresponding buttons 147 (FIG. 8) on the remote control device.

The entities that can be assigned to the preset buttons are dependent on the audio source selected by activating the appropriate graphical figure in the source selection region 78. If the CD source has been activated, the preset buttons are not active. If the AM broadcast or FM broadcast graphical figure have been activated, broadcast frequencies in the AM and FM broadcast bands, respectively, can be assigned to the preset buttons. For convenience and ease of identification, the call letters may also be displayed on the graphical representation. If the web radio audio source has been activated, a URL of a web radio website are assigned to the preset buttons. For ease of identification, the name, or other identification about the website is typically displayed on the preset buttons.

If the music files audio source has been selected, any assemblage, as discussed above, of recorded units can be assigned to a preset buttons. For combinations of recorded units, a play mode may also be assigned to the preset button. "Play modes" may include sequential, in which the recorded units are played in the order they appear in the database (typically, for example, for an album, this means in the order the individual "cuts"appear on the album), "shuffle" or "random," in which the recorded units are played in a random order, and "repeat"either single cuts or a sequence of cuts.

Figure 7:
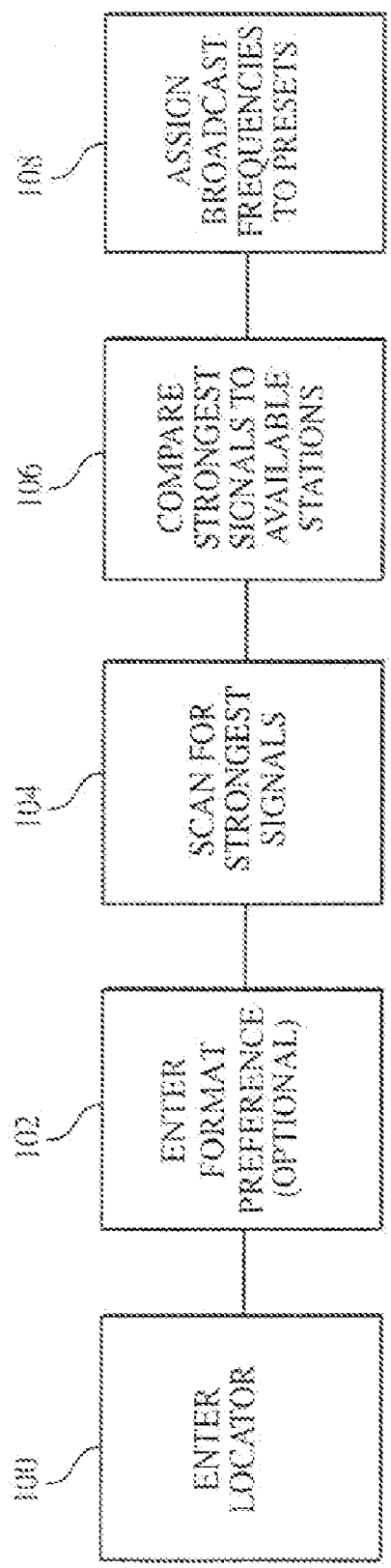
FIG. 7 is a flow diagram for assigning broadcast radio frequencies to the preset buttons according to the invention.

In one embodiment, initial preset assignment of broadcast radio stations is done automatically. Referring to FIG. 7, there is shown a flow diagram of a process for automatically initial preset assignment by a computer program running on computer system 20. In step 100, a locator is entered, for example, by a user entering a "zip code"using keyboard 44. In optional step 102, the user enters radio format preference or preferences (i.e. such as news, talk, type of music as discussed above). At step 104, the computer program directs AM/FM tuner 12 to scan the applicable broadcast frequency band for strong signals. At step 106, the strongest signals are compared to available stations based on the locator and information about available radio stations, as discussed above in the discussion of audio system mode operation. At step 108, the broadcast frequencies of the strongest signals are 108, the broadcast frequencies of the strongest signals are assigned by the computer program to the presets. If format preferences have been entered at optional step 102, the strongest signals for each of the selected formats may be assigned to the presets. The number of presets for each format is dependent on the number of presets available and the number of formats selected. For example, if the user has selected two formats and there are six presets available, the broadcast frequencies of the strongest three signals in each format are assigned to presets. If optional step 102 has not been performed, stations may be assigned to presets in other ways; for example, the strongest signal of each of the formats may be assigned to a preset, or the strongest signals, irrespective of format may be assigned to preset.

A user can enter control signals or data for controlling the operation of the sound system through three data/control input systems. A first input system includes the input devices of computer system 20, including mouse 40, keyboard 44, and external display 36. A second input system includes the buttons of control panel (FIG. 5) of sound reproduction device 10 of FIG. 1. A third input system includes the remote control device 17 of FIG. 1, shown in more detail in FIG. 8. In one implementation, different subsets of control signals and data input can be entered through each of the input systems. In this implementation the control panel (FIG. 5) has input buttons for the following control/data functions: four buttons 120 for entering control signals and data for various clock-radio functions of sound reproduction device 10; a sound reproduction device on/off switch 122; a broadcast band selector button 124; an aux input selector 126; volume control buttons 127; two tuning buttons 128; and preset buttons 72a–72f, discussed above. Remote control device (FIG. 8) has input buttons for the following control/data functions: sound reproduction device on/off switch 130; volume control buttons 134; broadcast band selector button 136; PC signal source selector buttons 138, preset selector buttons 140a–140f, CD player pause button 141; and five "overloaded" or multi-use buttons. Button 142 activates the "snooze" feature if the sound reproduction device has been turned on to a broadcast radio station by the alarm, or mutes or unmutes the sound reproduction device if the sound reproduction device has been turned on any other way. Button 144 turn off the alarm if the clock radio alarm feature of the sound reproduction device is sounding, or stops the CD player 28. Track/tune button 147 is discussed in more detail below.

Equivalent control signals that can be entered from more than one of the three input systems have the same effect, regardless of which input system was used to enter the data or control signal. For example, if the sound source is FM broadcast radio, and preset button 1 is activated, the audio system tunes to the broadcast frequency represented by preset button 1, regardless of whether the preset button was activated by pressing preset button 72a on the control panel, pressing preset button 140a, on remote control device 17, or by selecting preset icon 150a on the user interface screen (FIG. 6) shown on display 36 (FIG. 1). Additionally, if the data or control signal is entered through remote control device 17 or through the sound reproduction device control panel (FIG. 5), a visible indication is displayed on the user interface screen (FIG. 6). For example, if preset button 140a (preset button 1) is pressed on remote control device 17, a visible indication appears on user interface screen (FIG. 6) shown on display 36.

The effect of the control signal may depend on the source of the audio signals. For example, if the source of the audio signals is the AM/FM tuner 12 (FIGS. 1 and 2), selecting the "tuning" buttons 128 (FIG. 5) on the control panel, or the corresponding buttons 147 (FIG. 8) on the remote control device, or the corresponding graphical FIG. 79 (FIG. 6) causes the tuning frequency of the AM/FM tuner to change. If the source is music files, the names of the music files may appear in the available selections region 90 (FIG. 6) of the interface screen, and selecting of the tuning buttons on the control panel or the equivalent control buttons on remote control device or the equivalent graphical figure on the display screen may cause the display to change the highlighted music file. If the source is web radio stations, the available web radio stations my appear in the available selections region 90 (FIG. 6) of the interface screen, and selecting of the tuning buttons on the control panel or the equivalent control buttons on remote control device or the equivalent graphical figure on the display screen may cause the display to change the highlighted web radio station.

In the event that the control electronics circuitry 16 (FIG. 1) of the sound reproduction device receives from remote control device 17 a remote control signal that control electronics circuitry 16 cannot decode, the control electronics circuitry retransmits the remote control signal to computer system 20 for decoding.

For ease of selecting individual sources, in one embodiment, in addition to specifying a category (such as music files, broadcast radio stations, computer network accessible radio stations, music files, and CD) of sources, the user may select from a subset of all the sources in a category. For example, if the user has selected broadcast FM, broadcast AM, or network accessible radio as the source category, the user may choose to select an individual radio station from a subset of all available radio stations, the subset including only radio stations having a particular format, such as news; or if the user has selected music files as the source category the user may choose to select a file from a subset of all available files, the subset including only music of a certain type, such as jazz.

Figure 8:
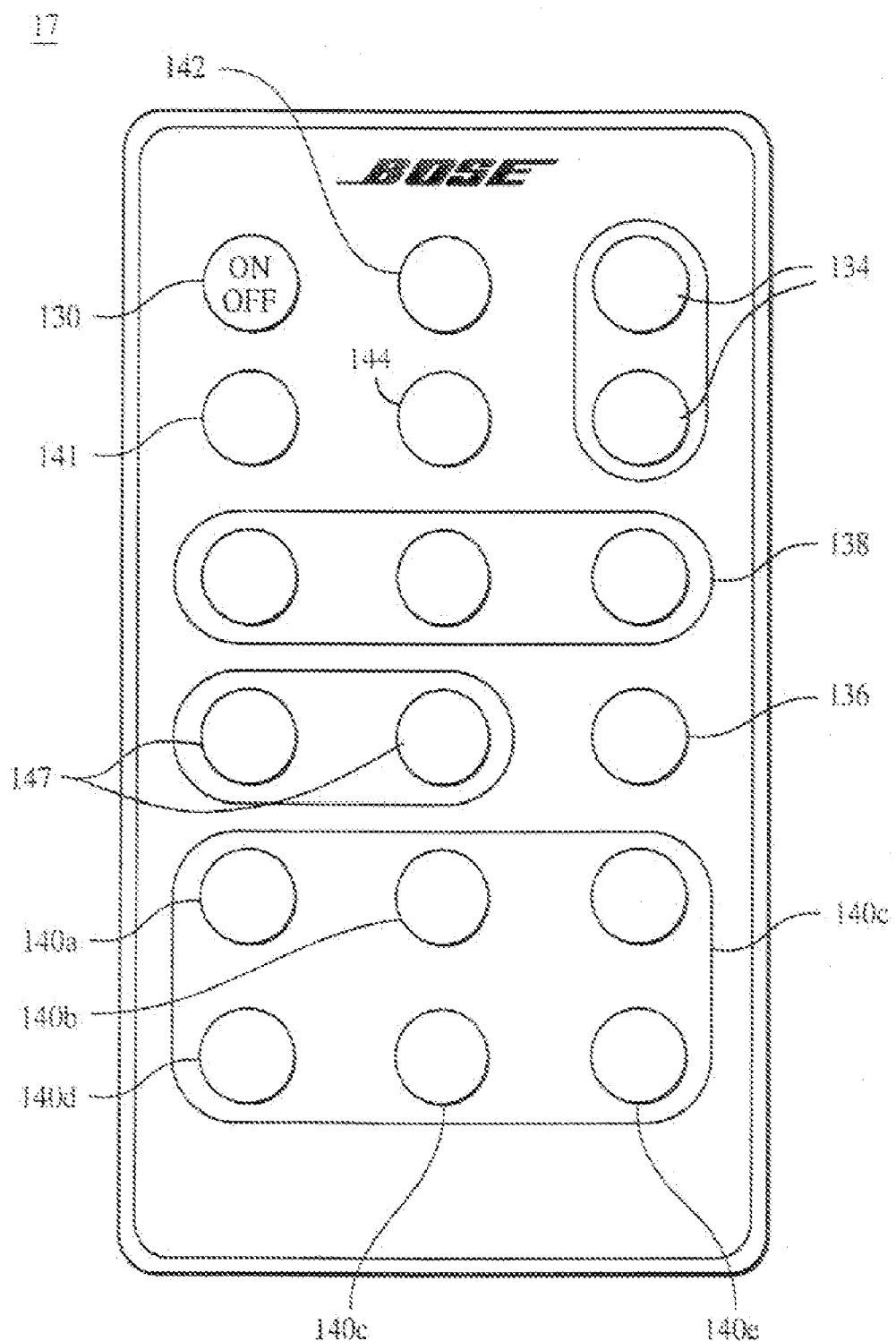
FIG. 8 shows the buttons on the remote control device.
Figure 9A:
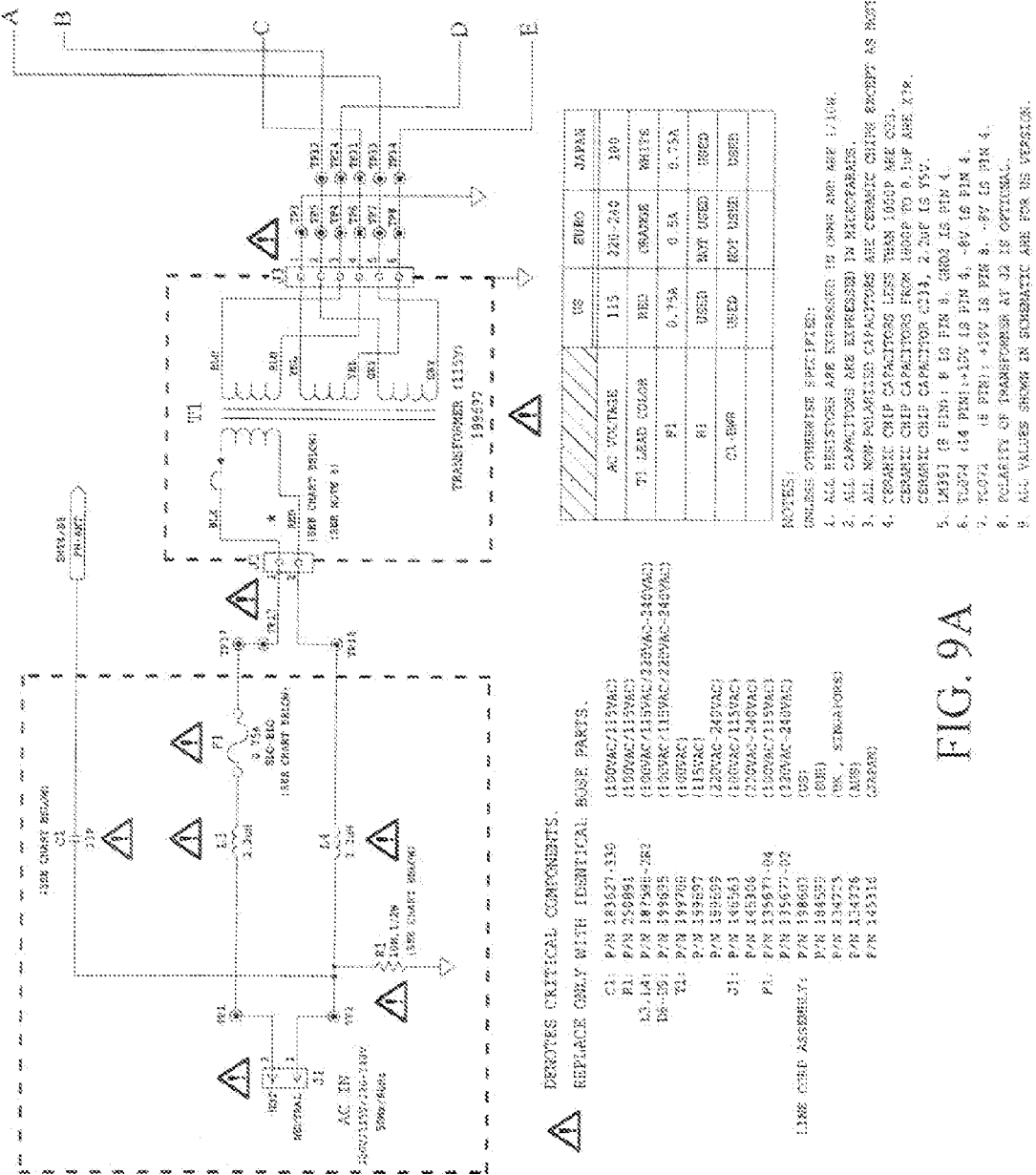
FIGS. 9A-9R are schematic circuit diagrams of circuitry in a radio that implement elements 12, 14 and 16 of the system of FIG. 2.
Figure 9B:
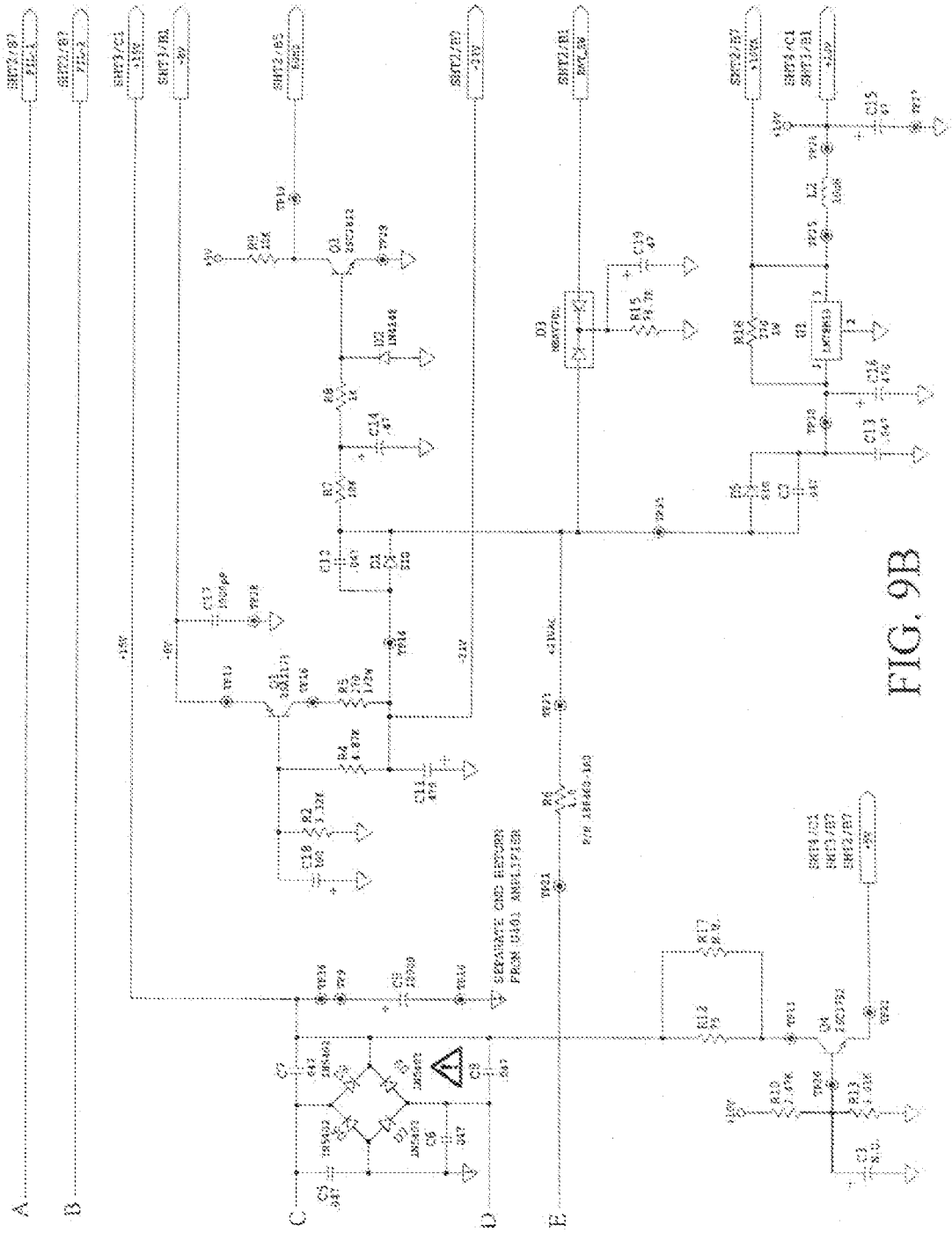
Figure 9C:
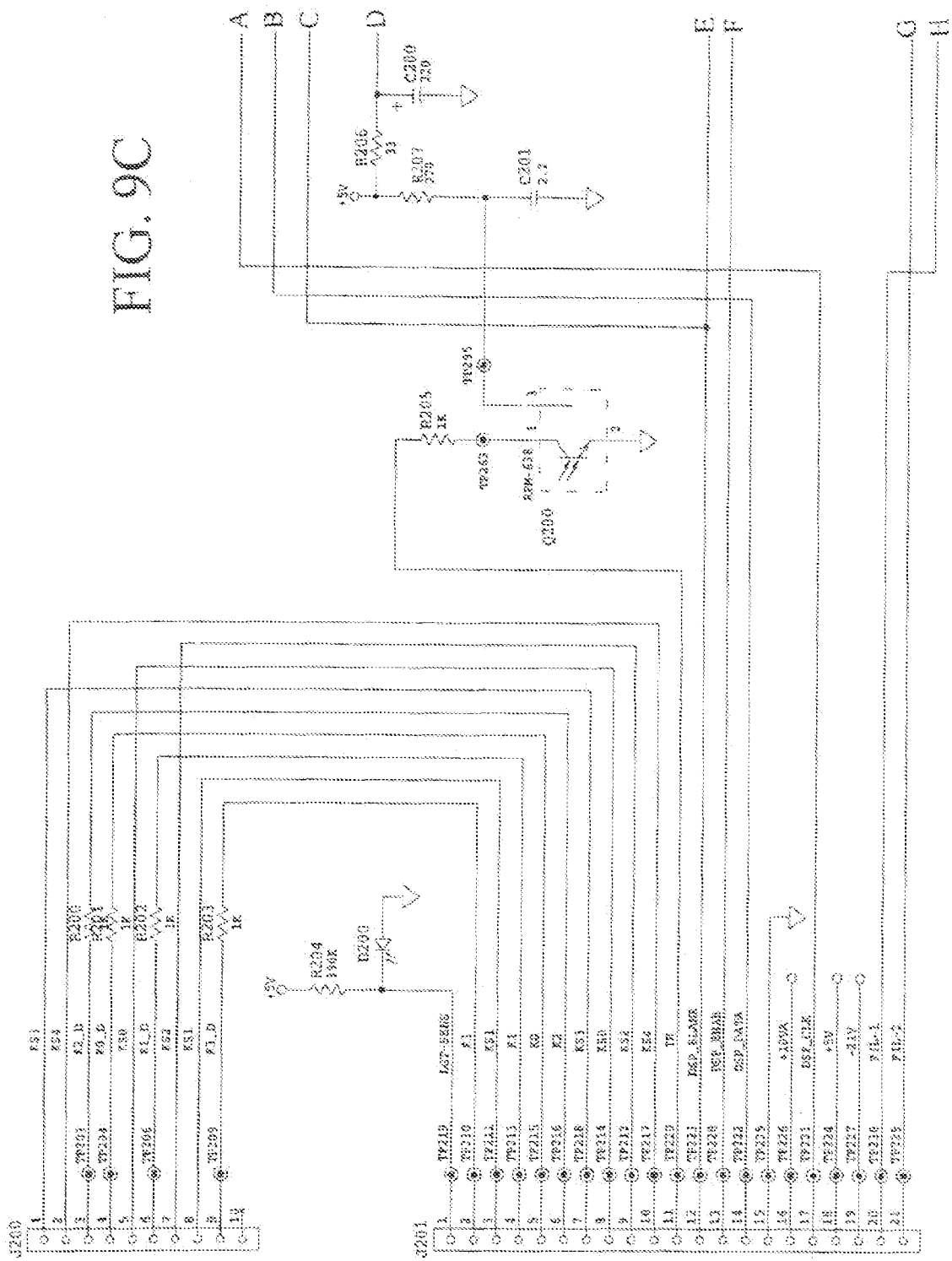
Figure 9D:
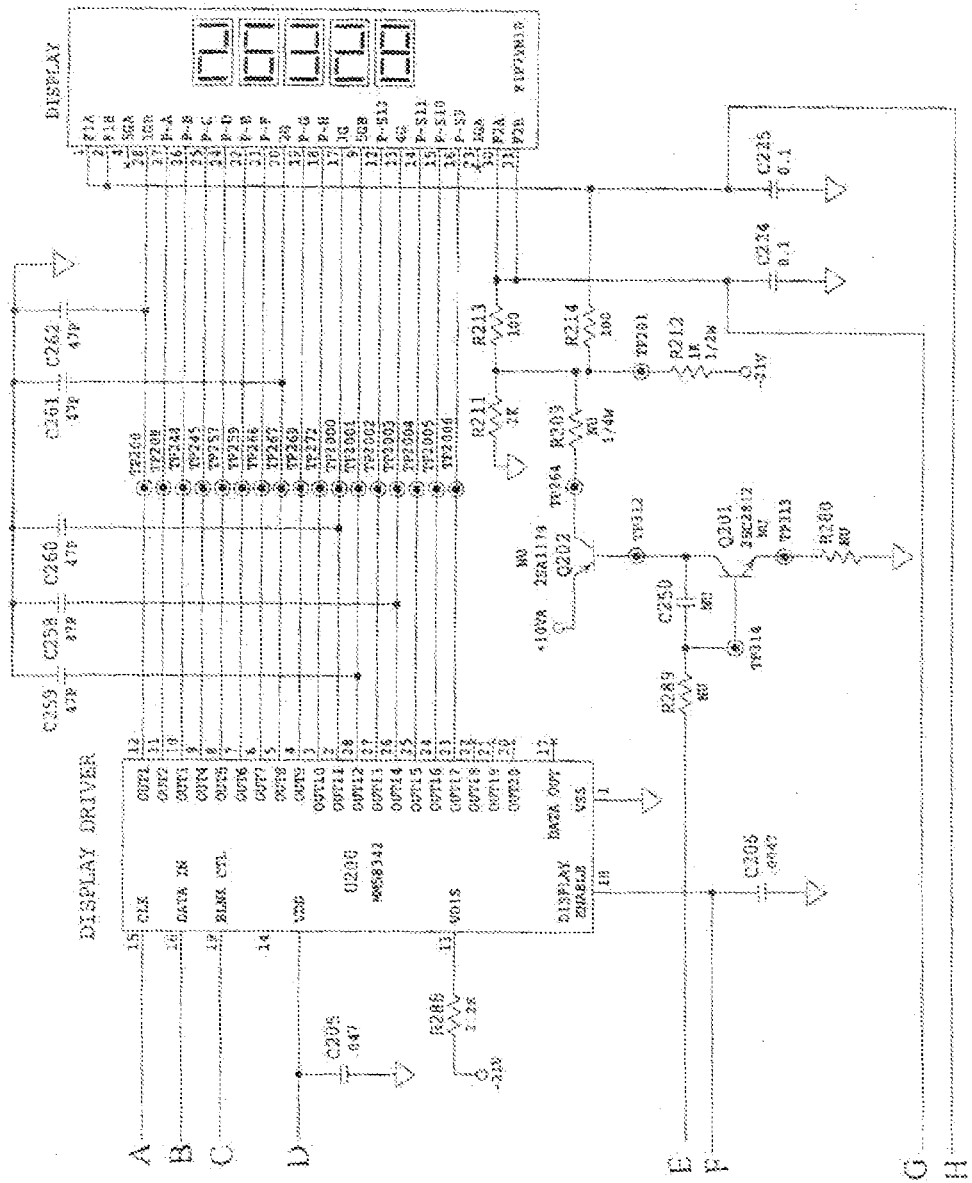
Figure 9E:
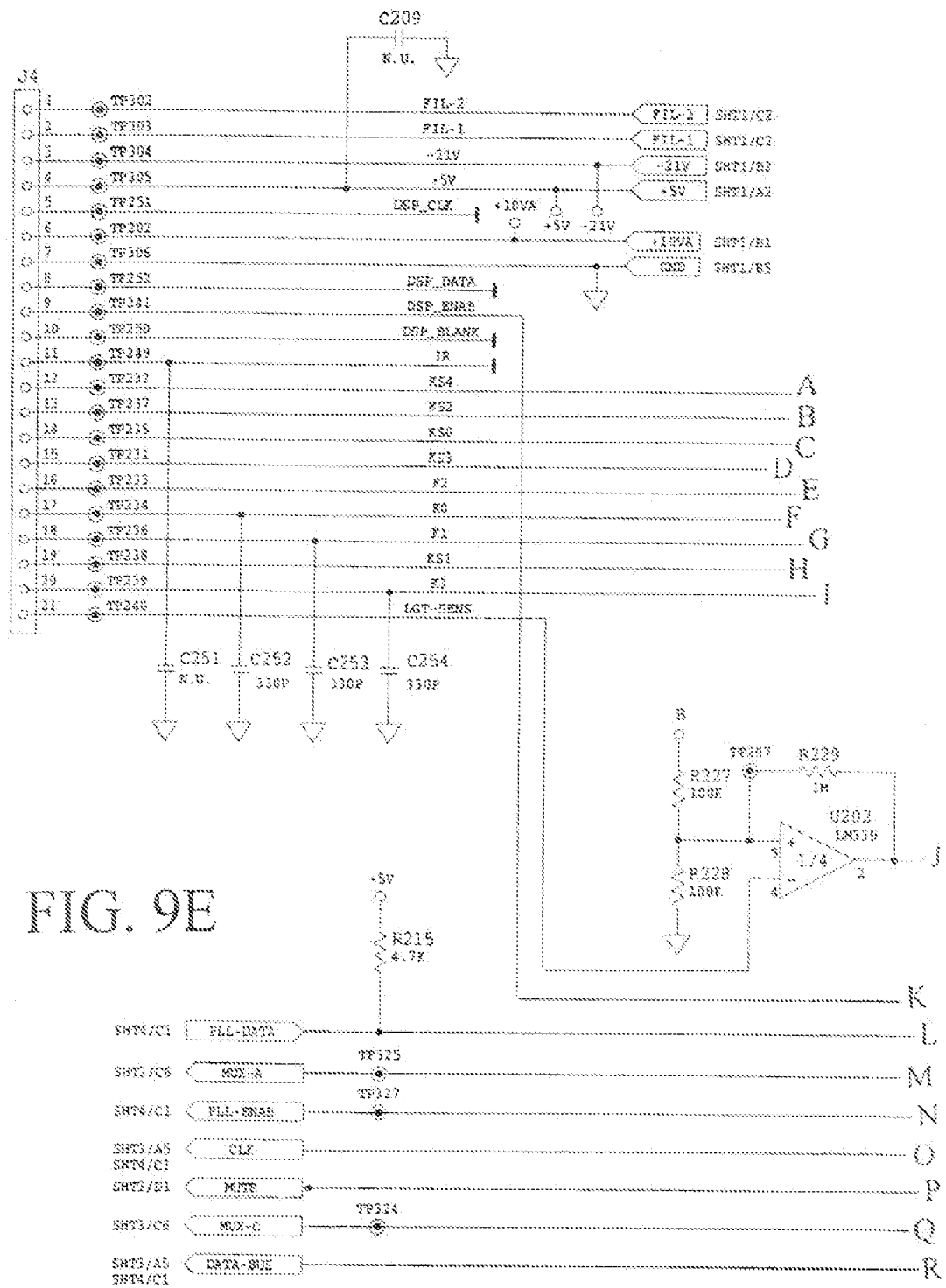
Figure 9F:
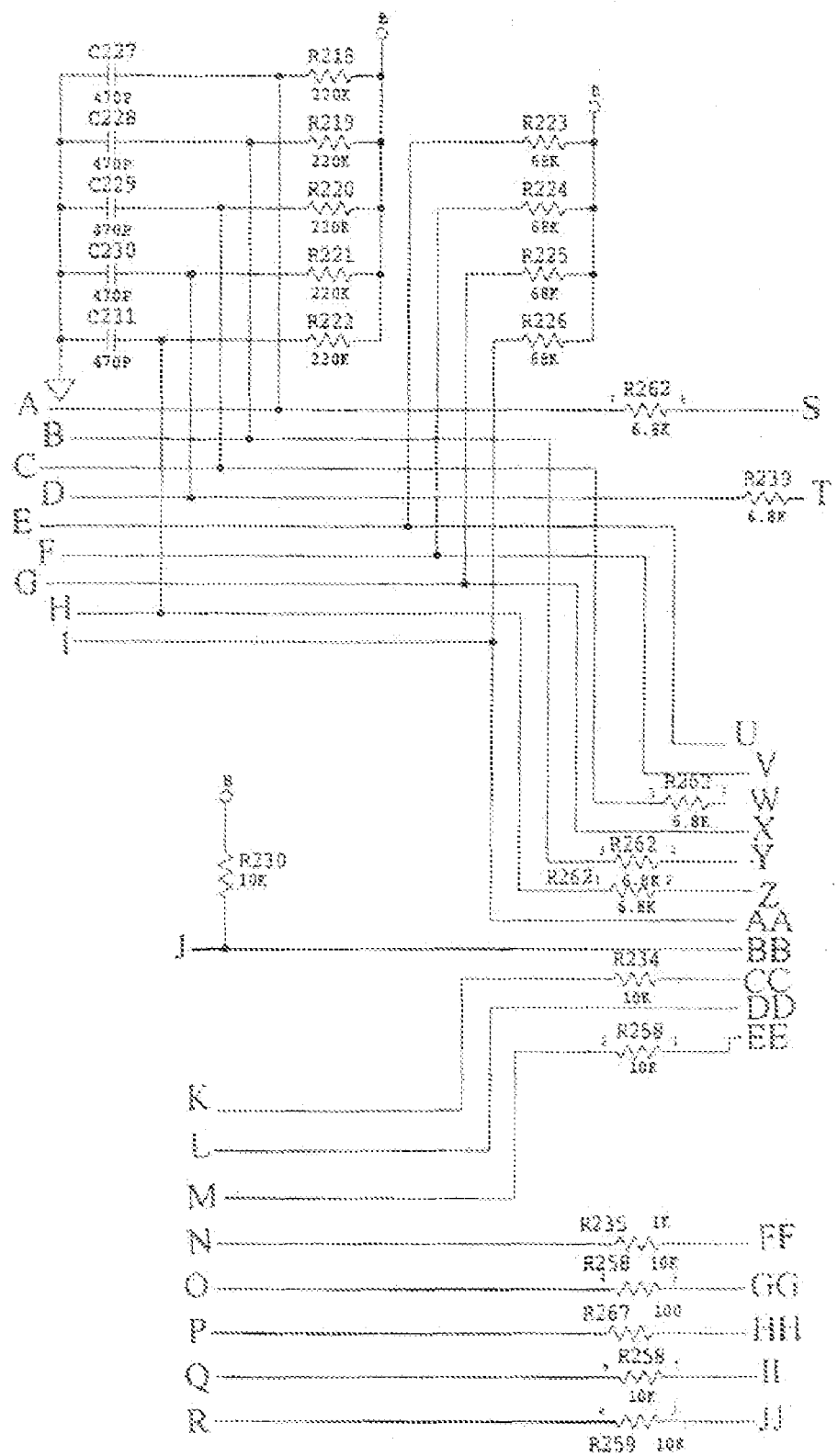
Figure 9G:
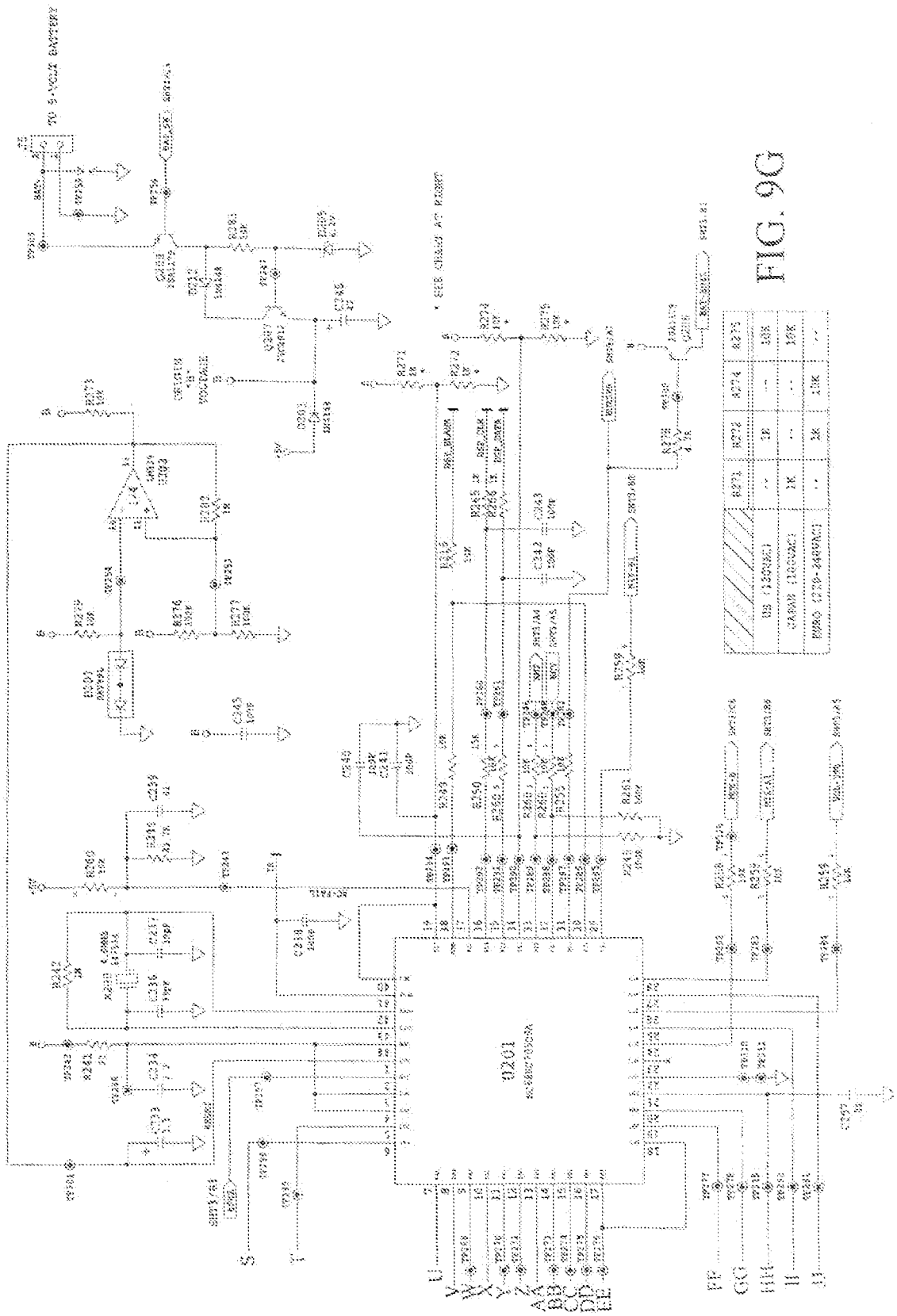
Figure 9H:
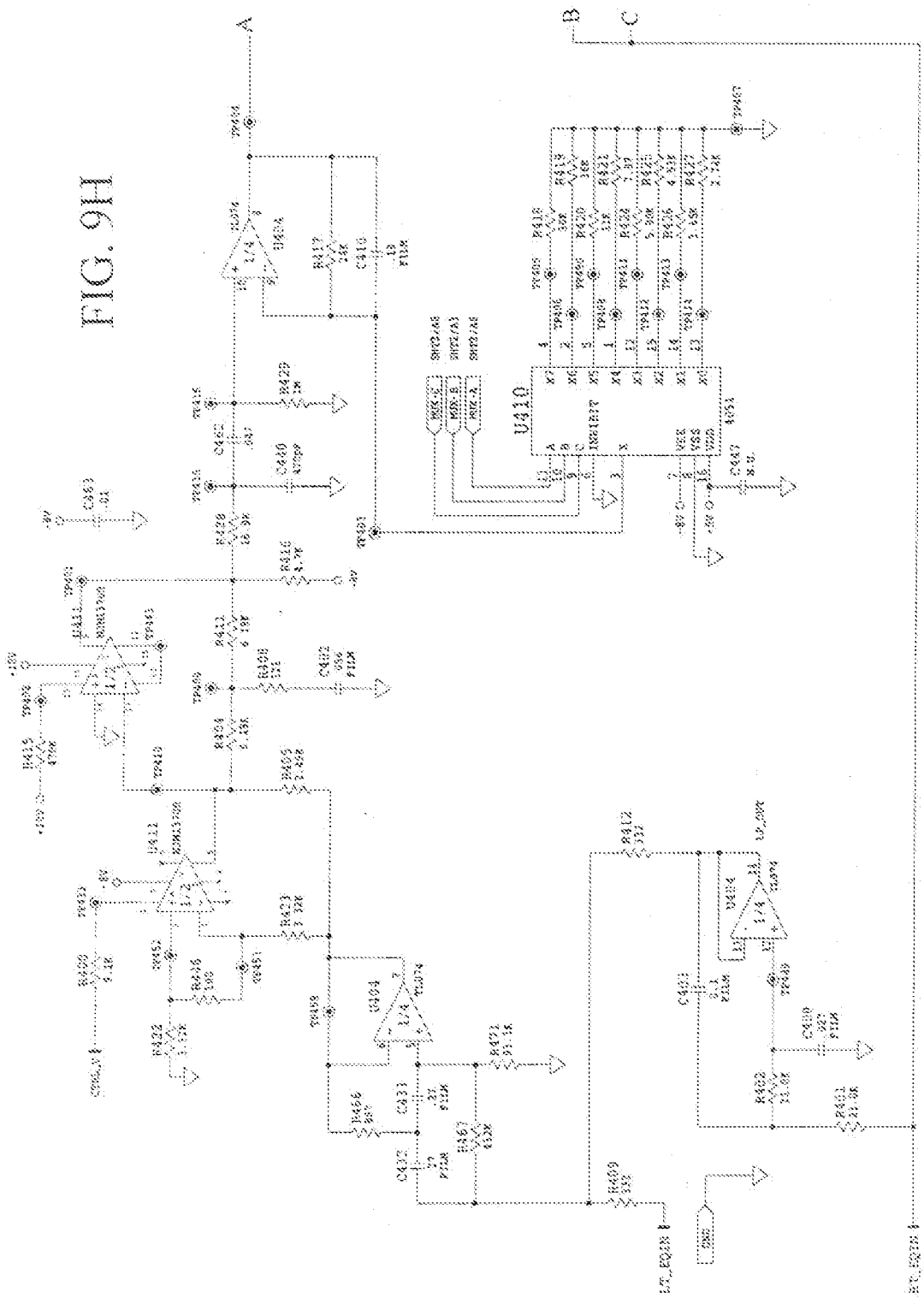
Figure 9I:
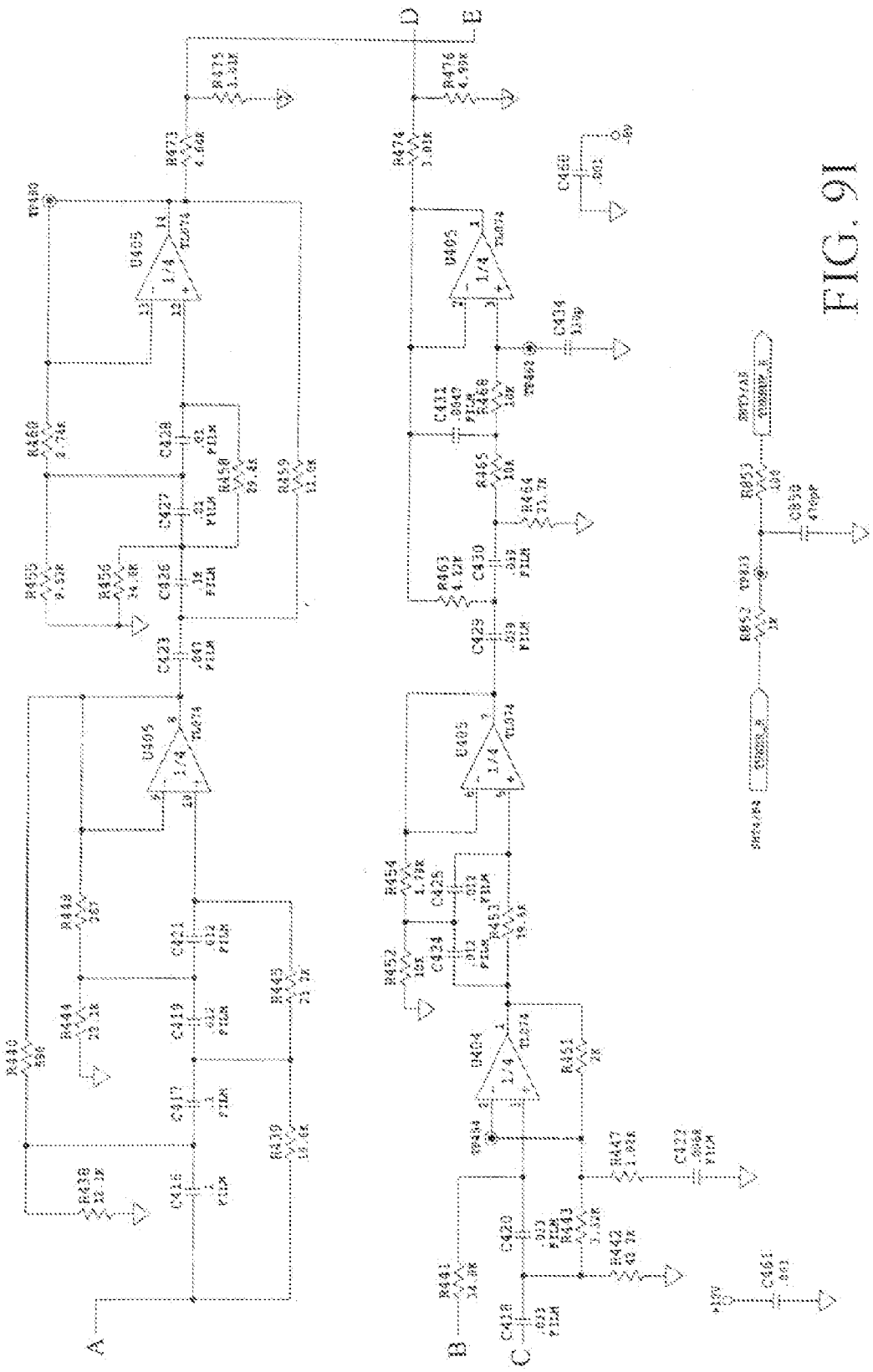
Figure 9J:
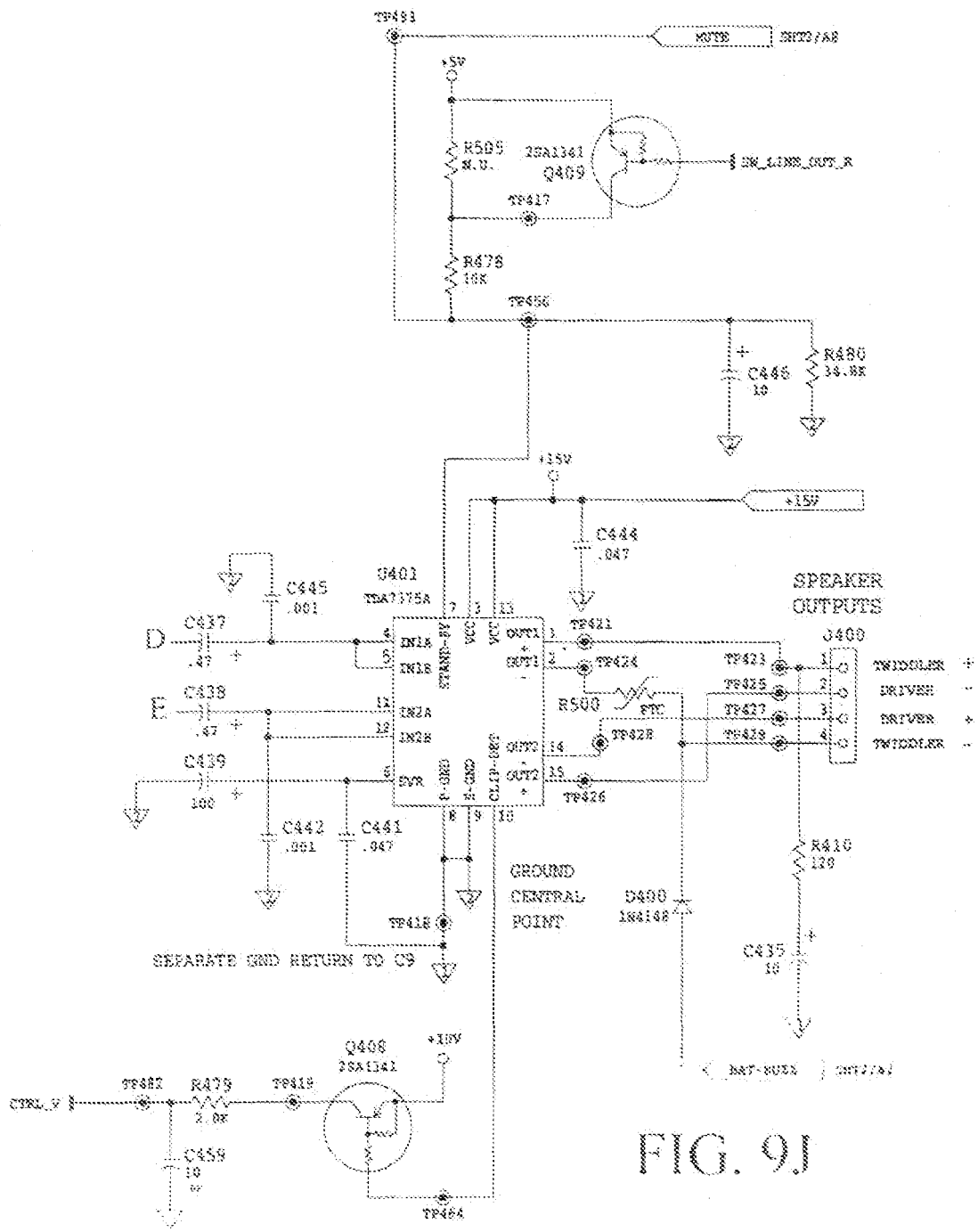
Figure 9K:
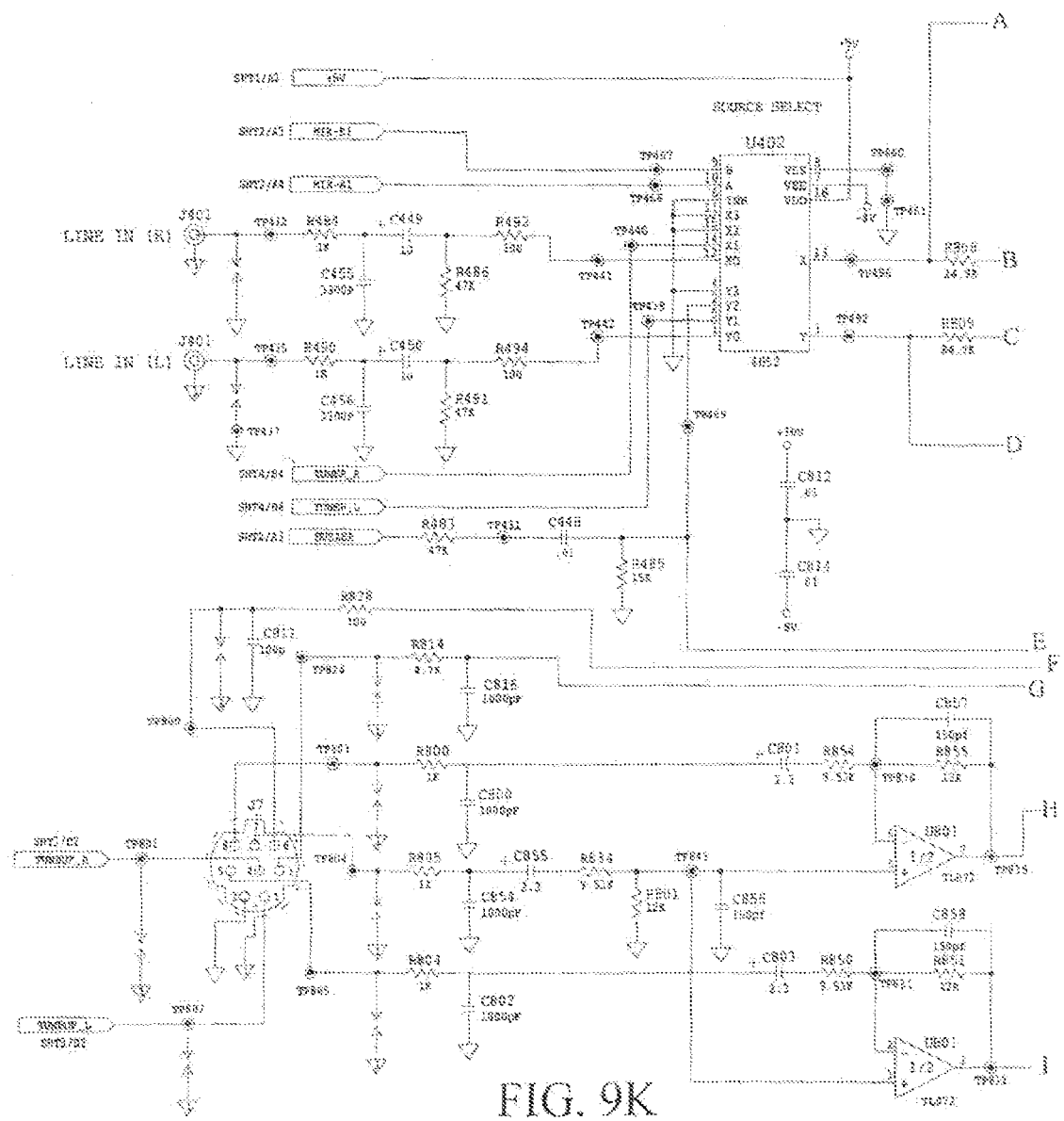
Figure 9L:
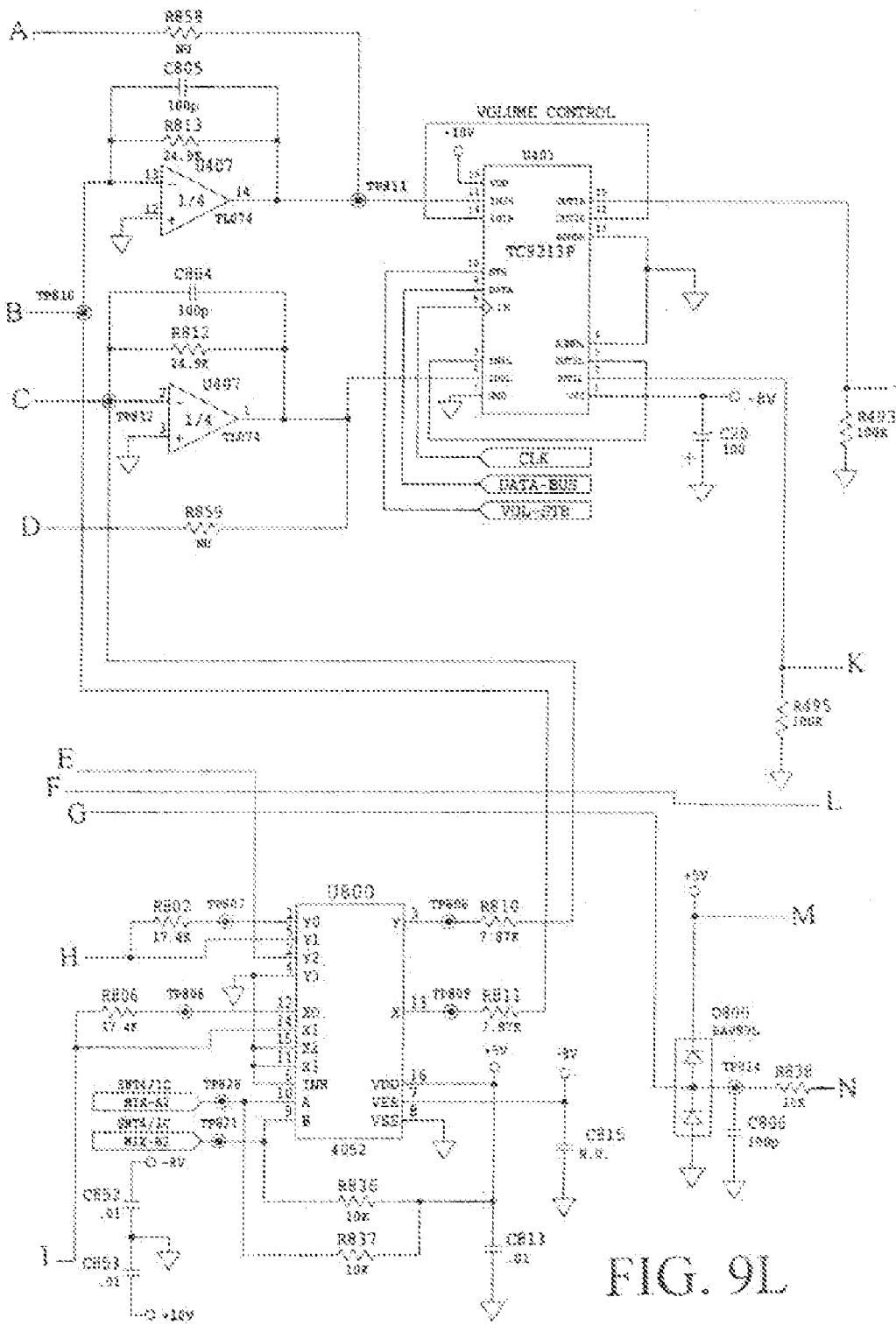
Figure 9M:
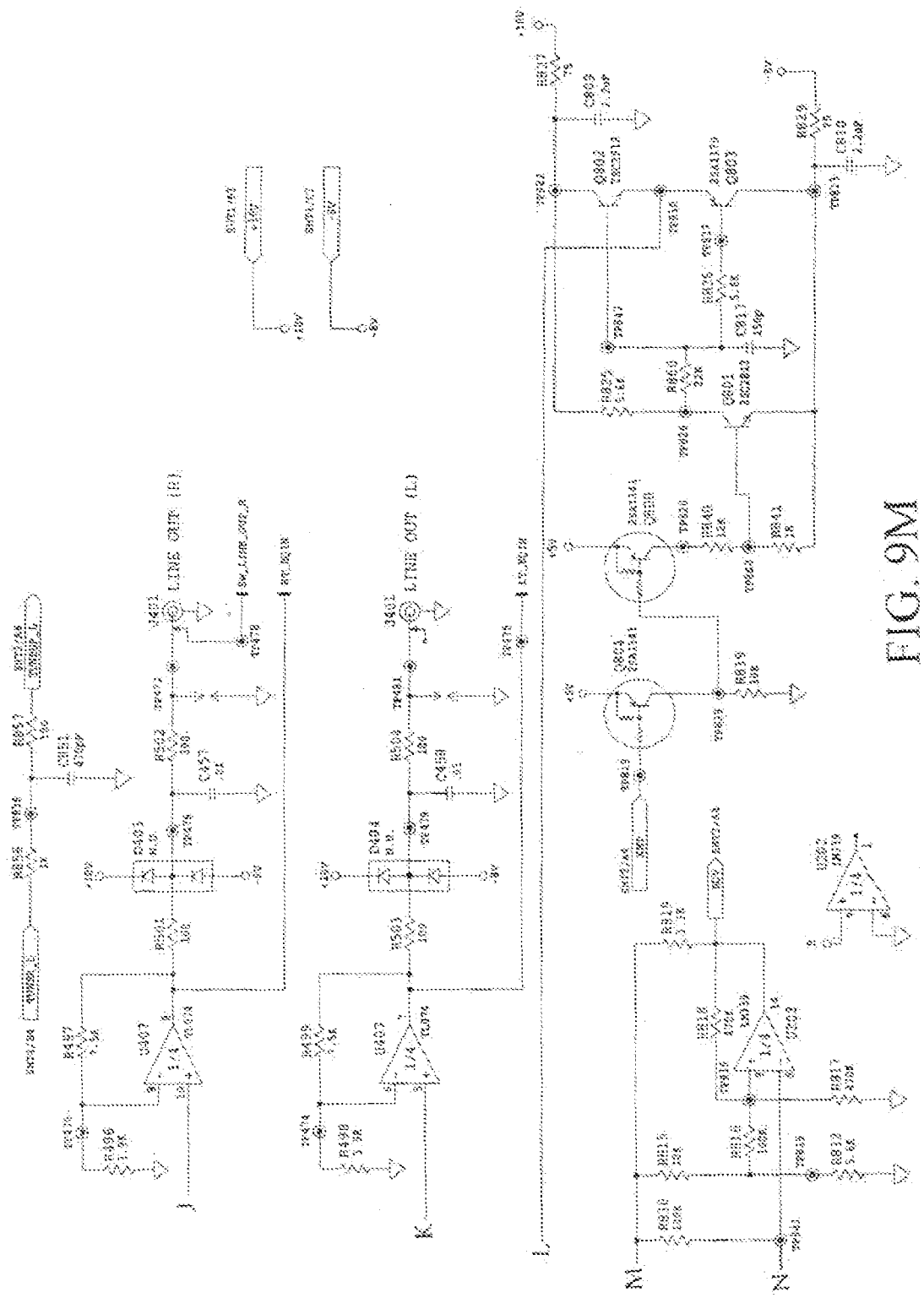
Figure 9N:
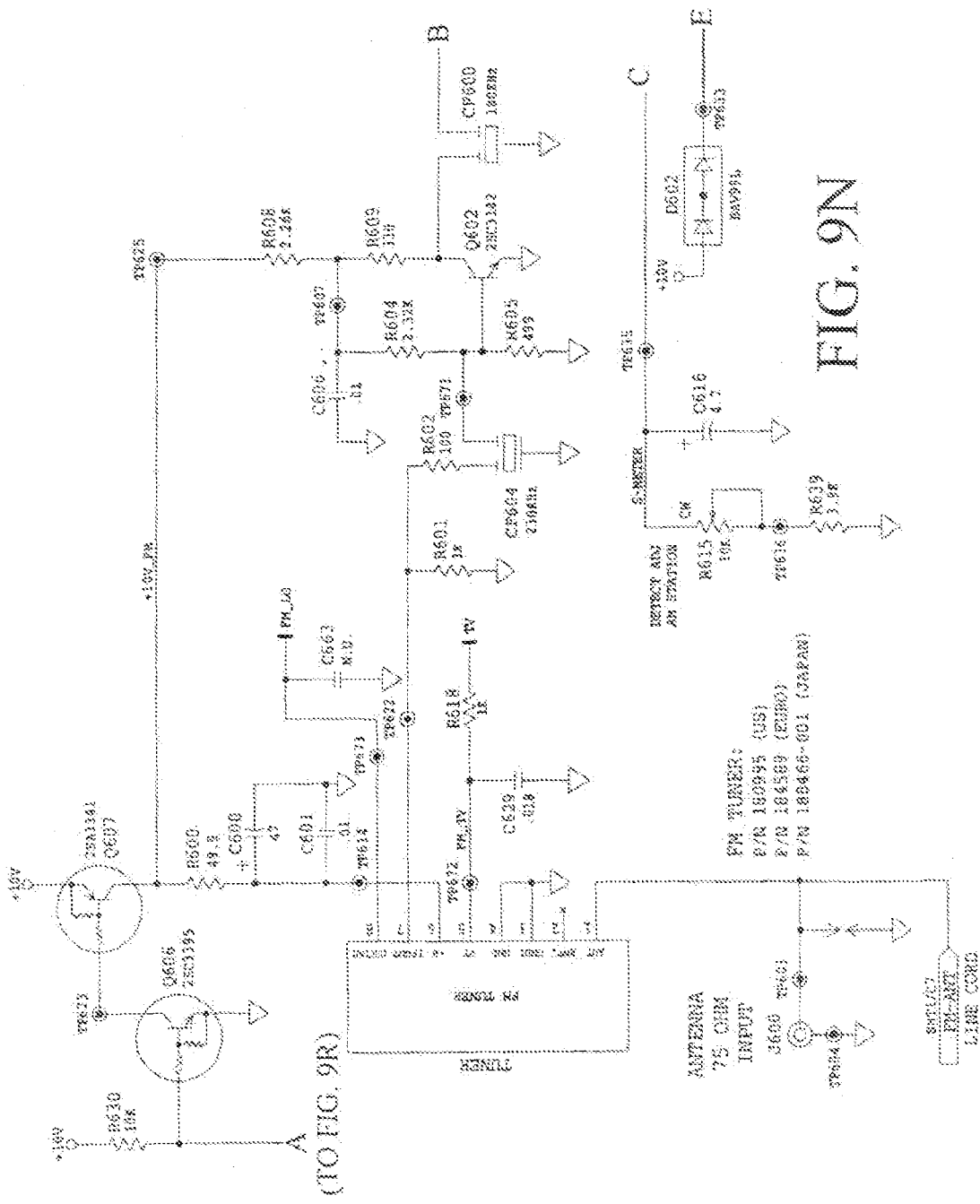
Figure 9O:
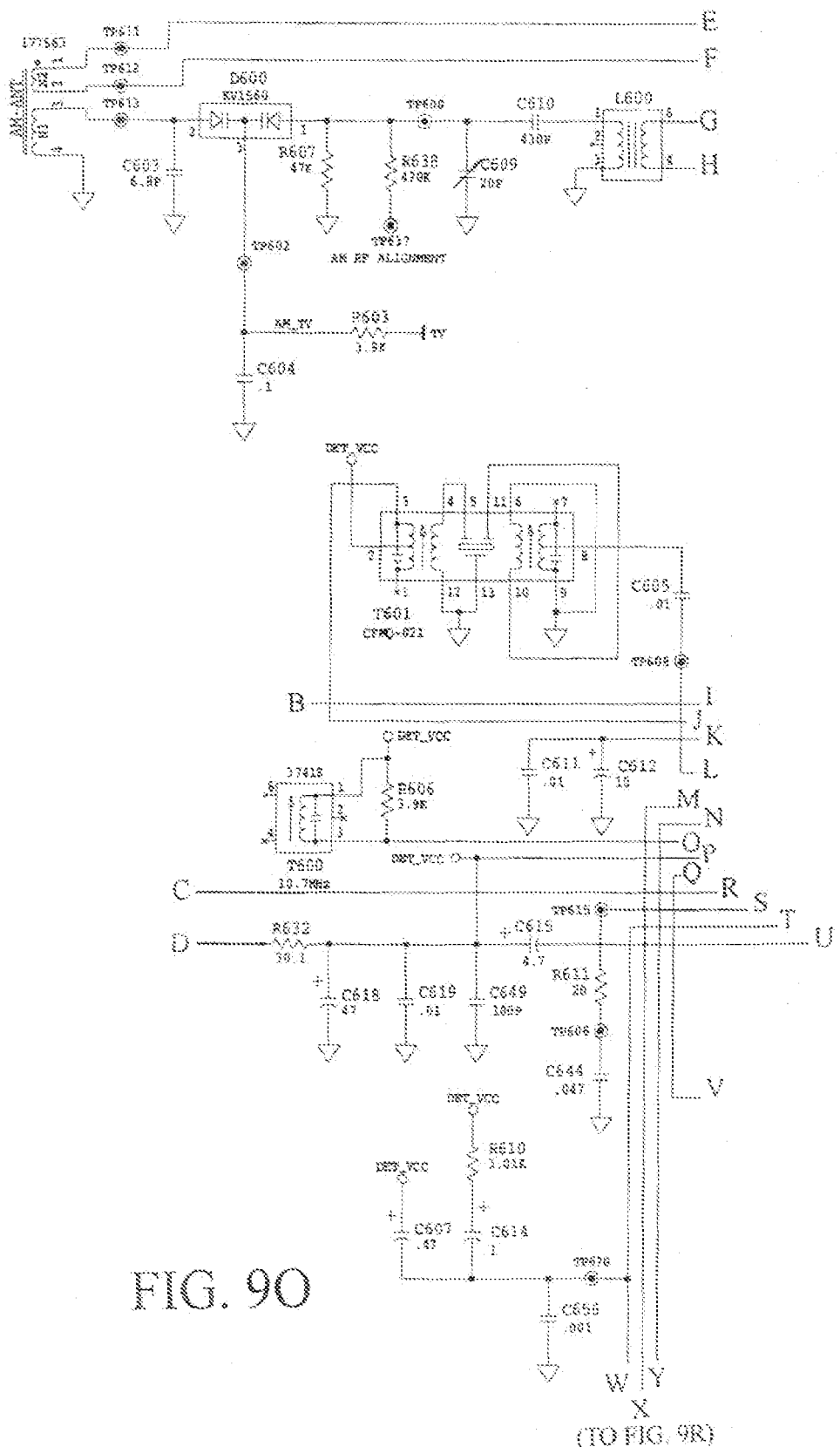
Figure 9P:
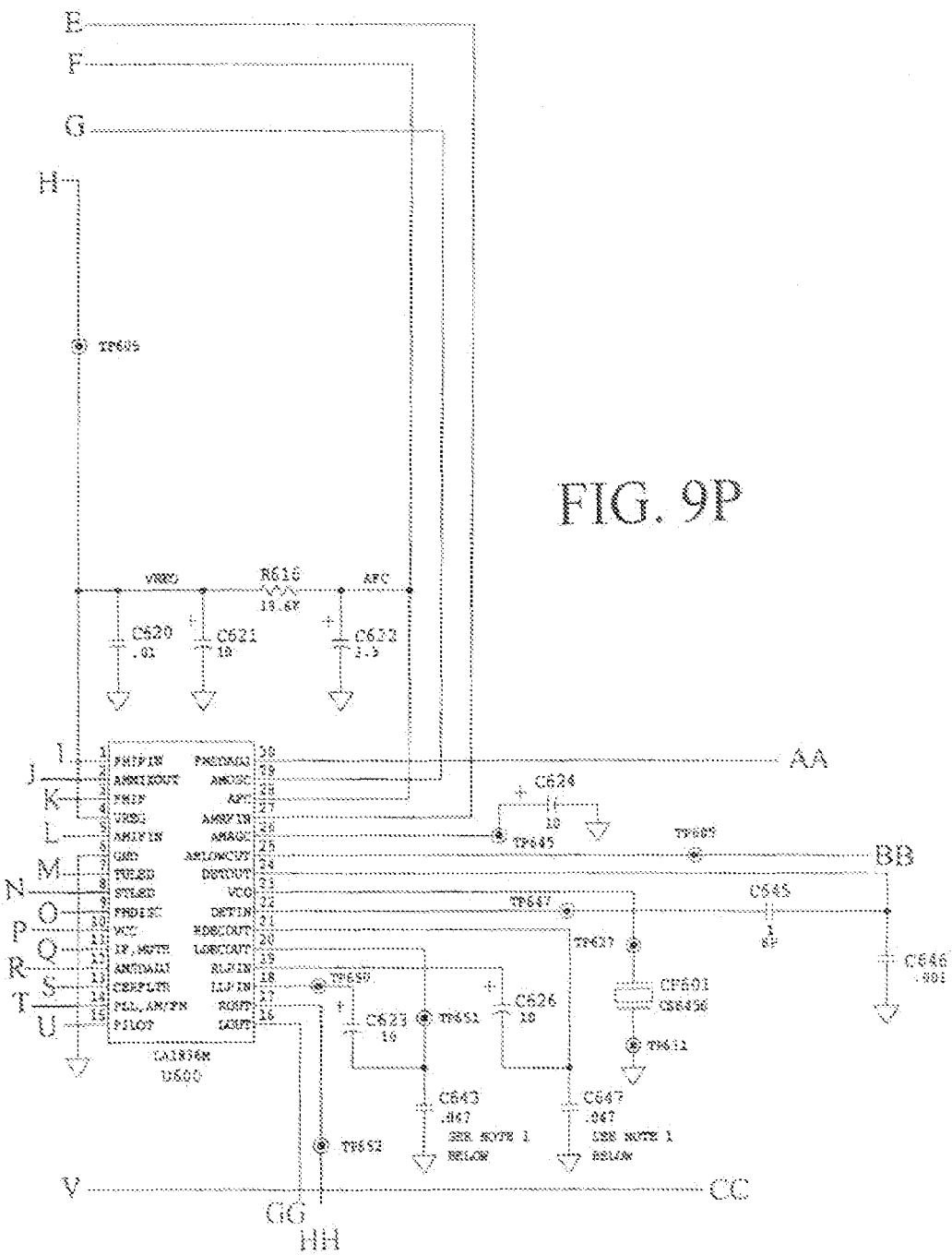
Figure 9Q:
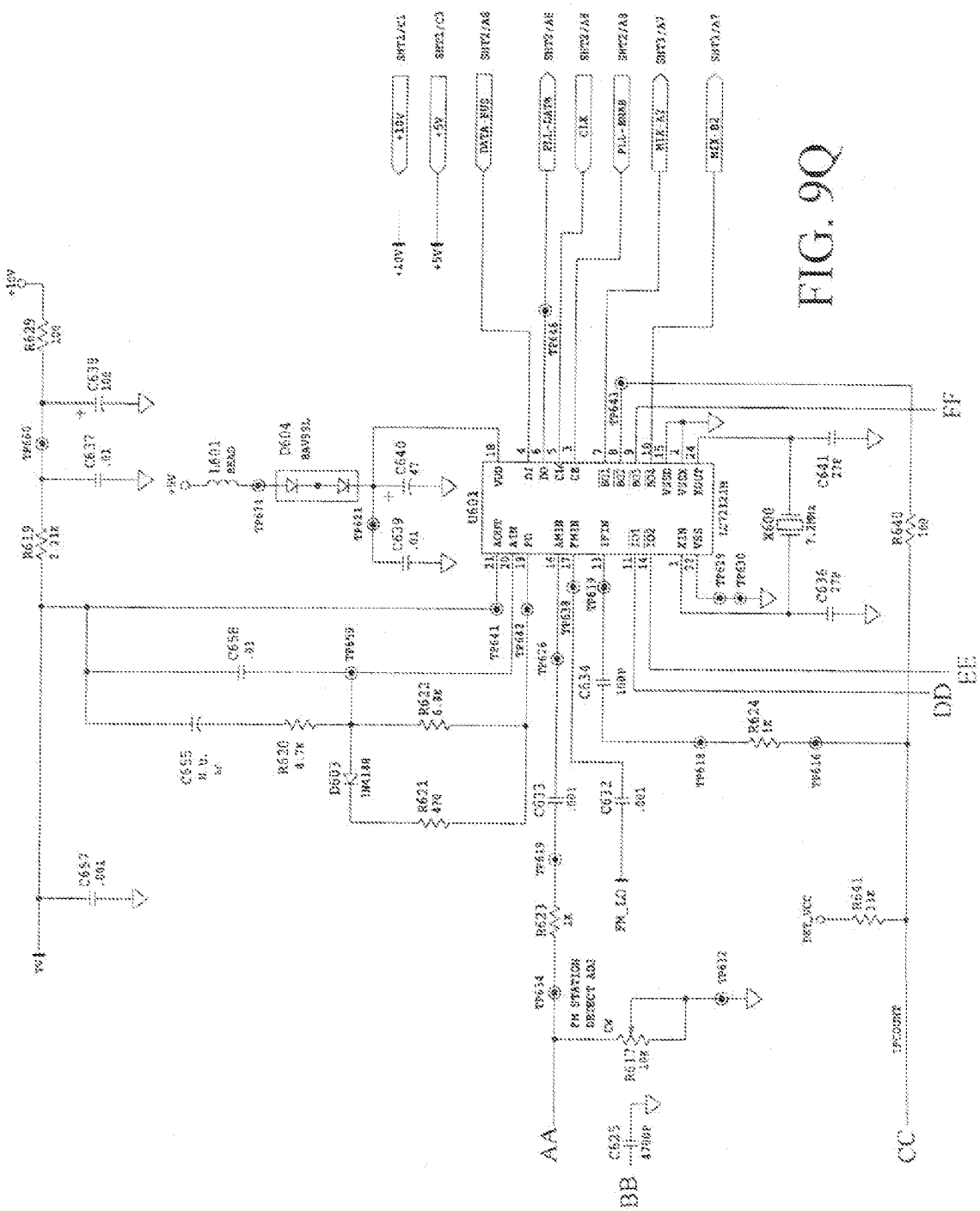
Figure 10A:
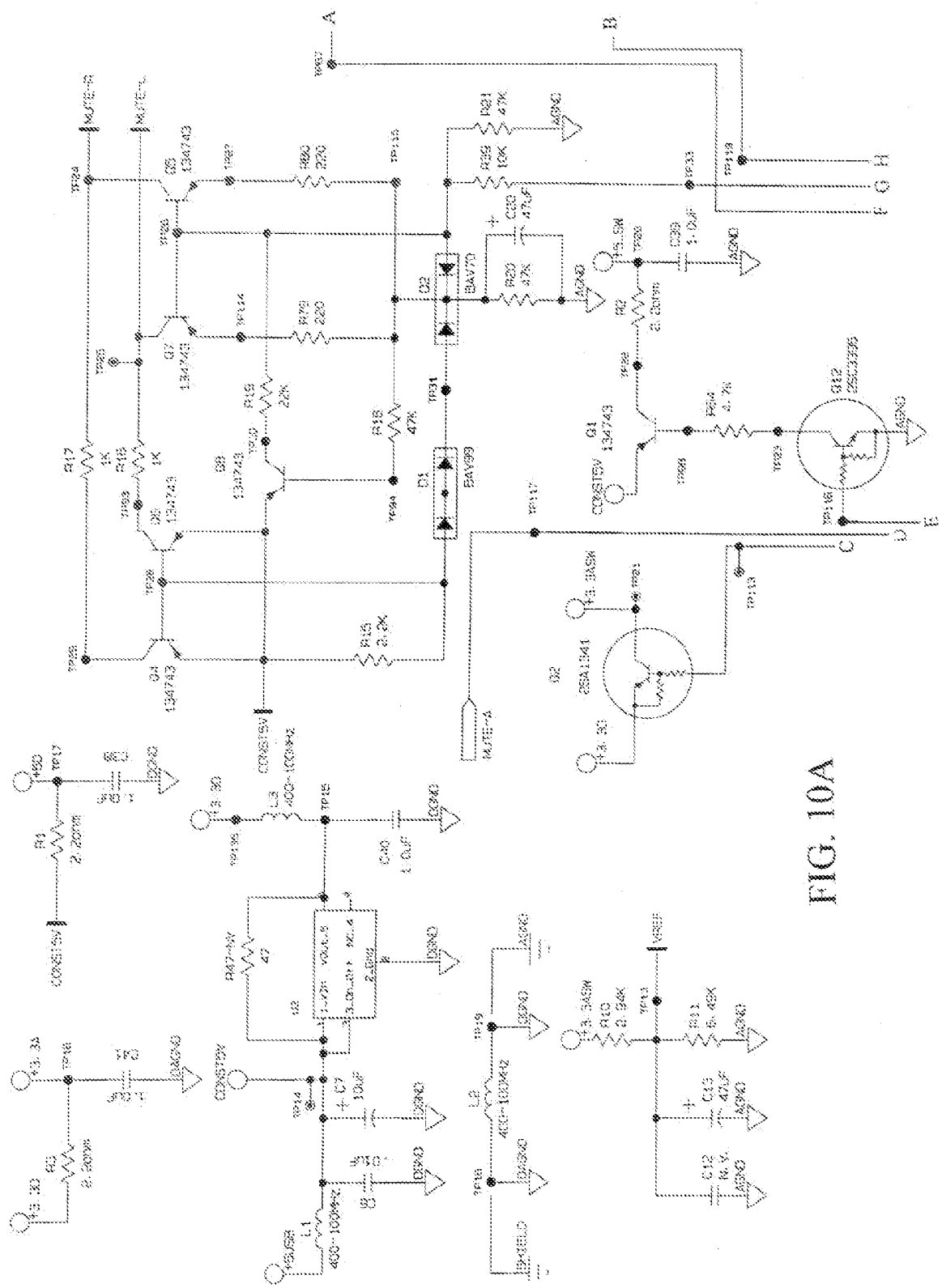
FIG. 10A-10F represent an implementation of the interface unit 54 of FIG. 2.
Figure 10B:
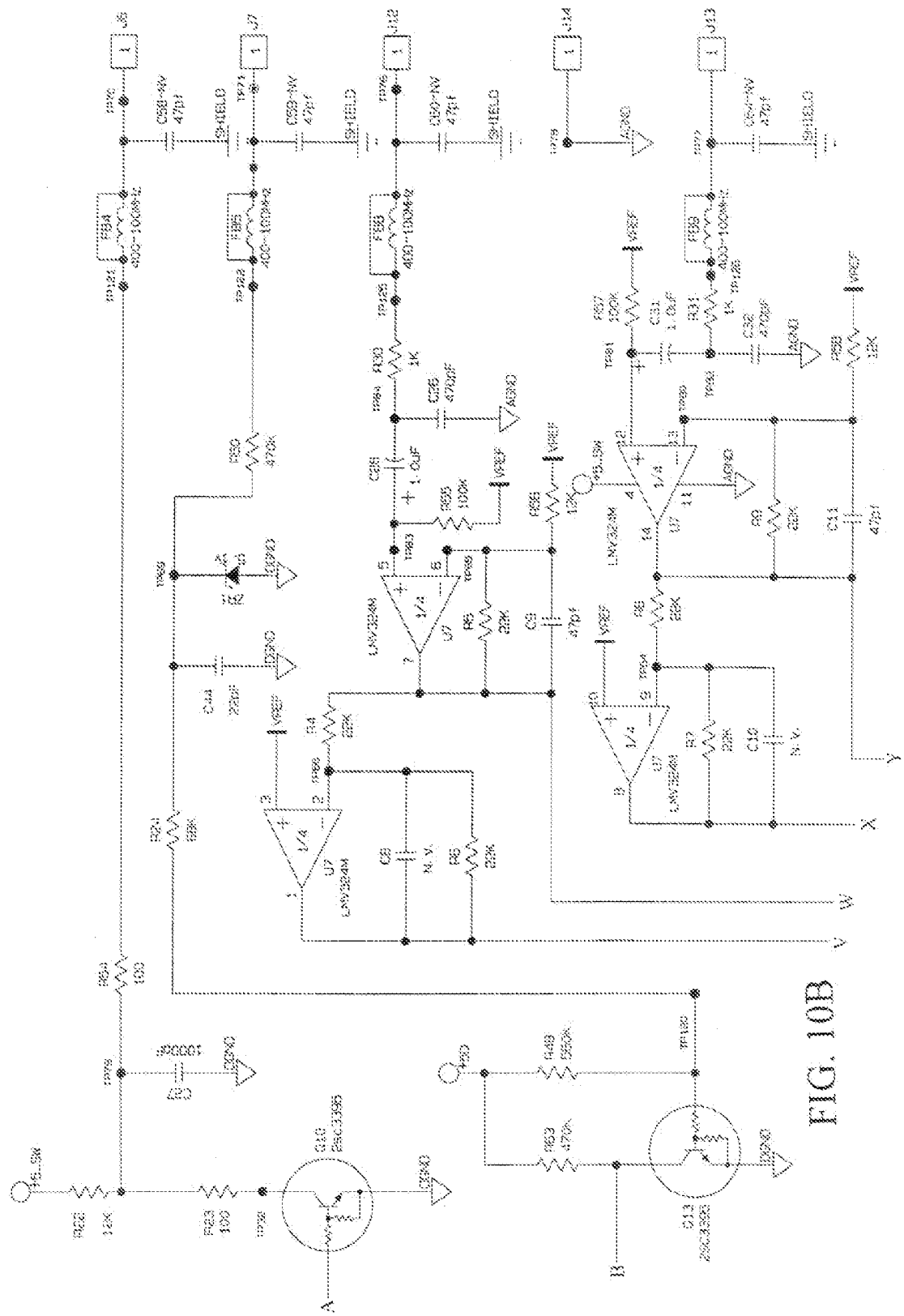
Figure 10C:
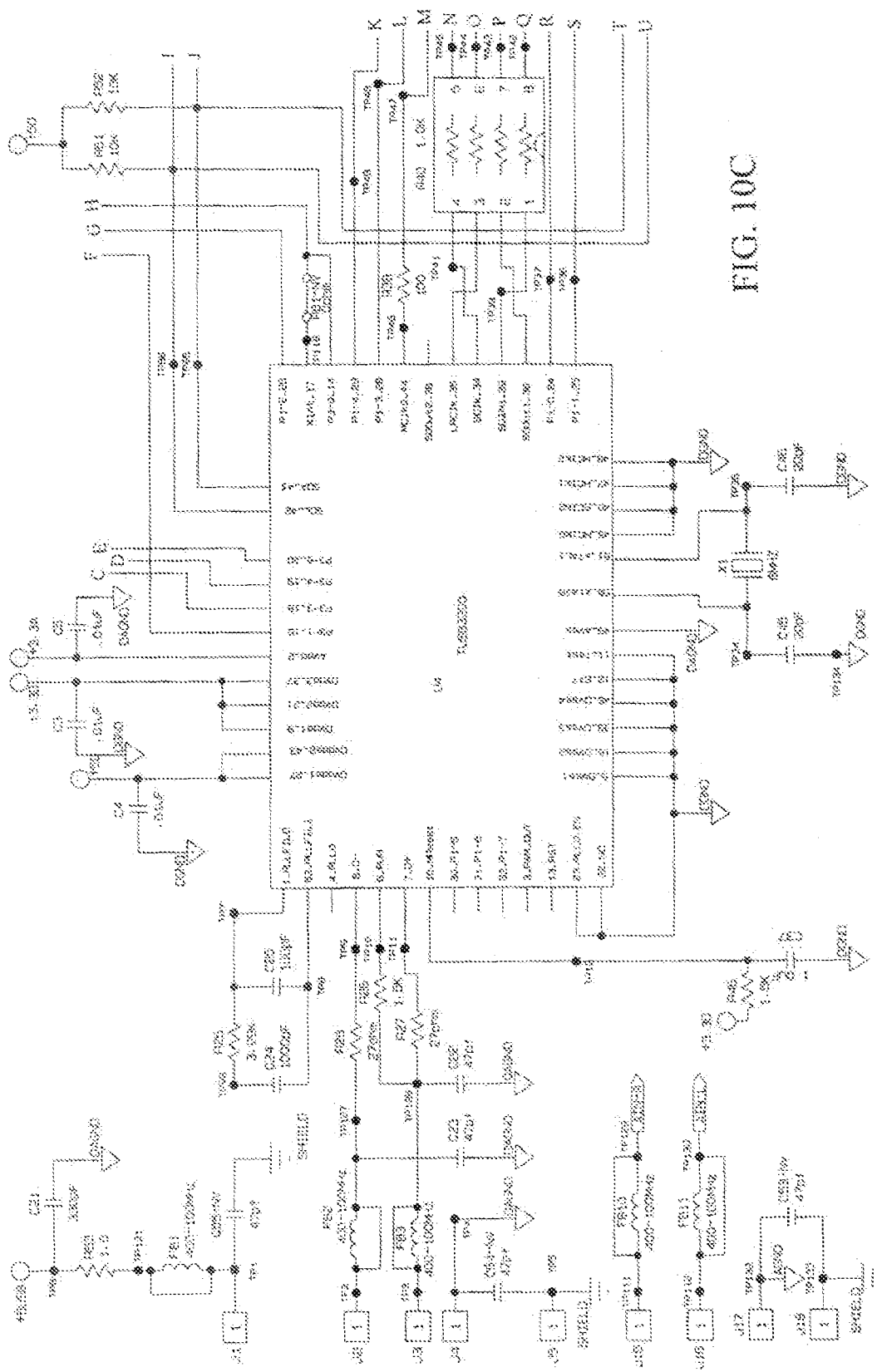
Figure 10D:
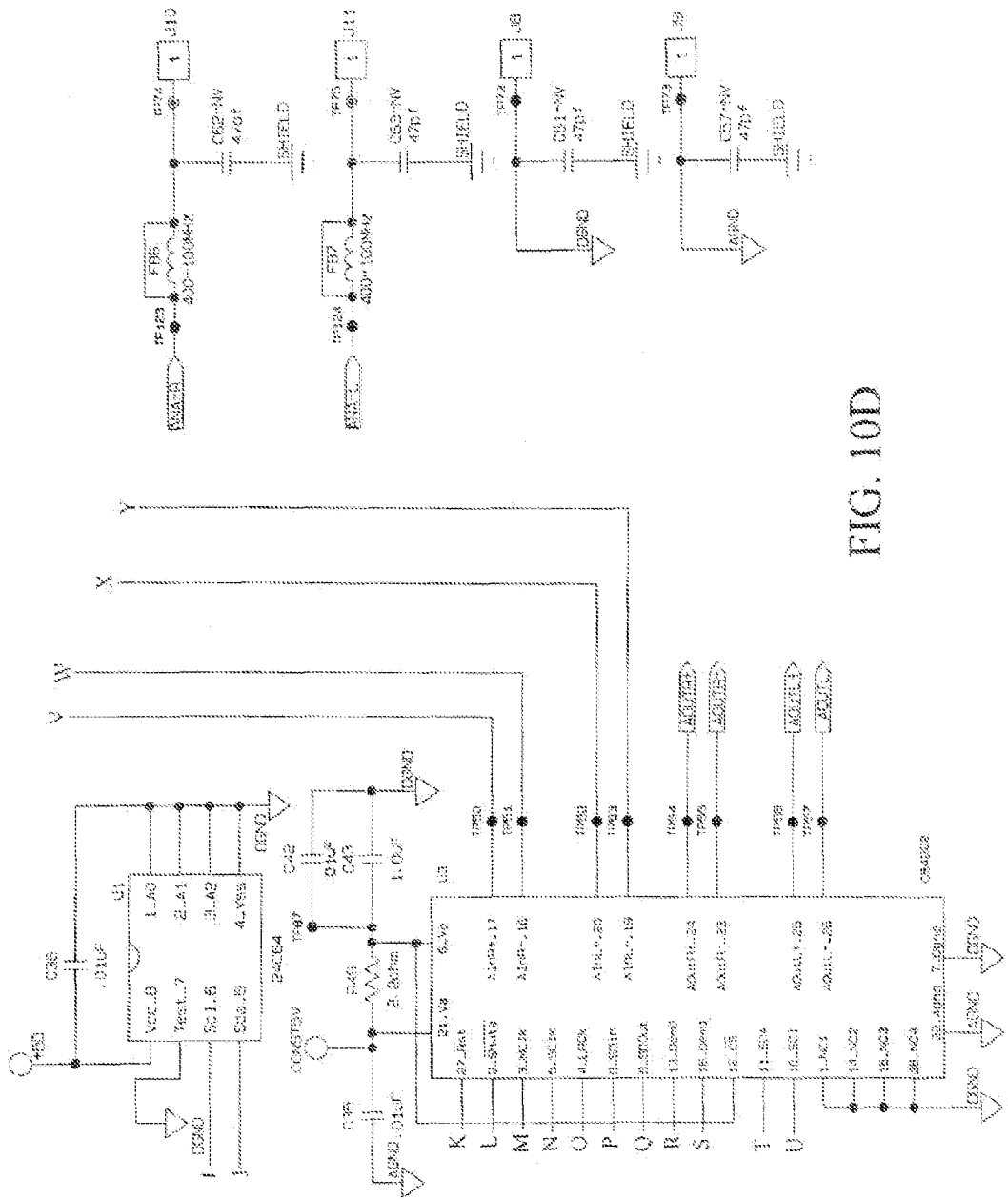
Figure 10E:
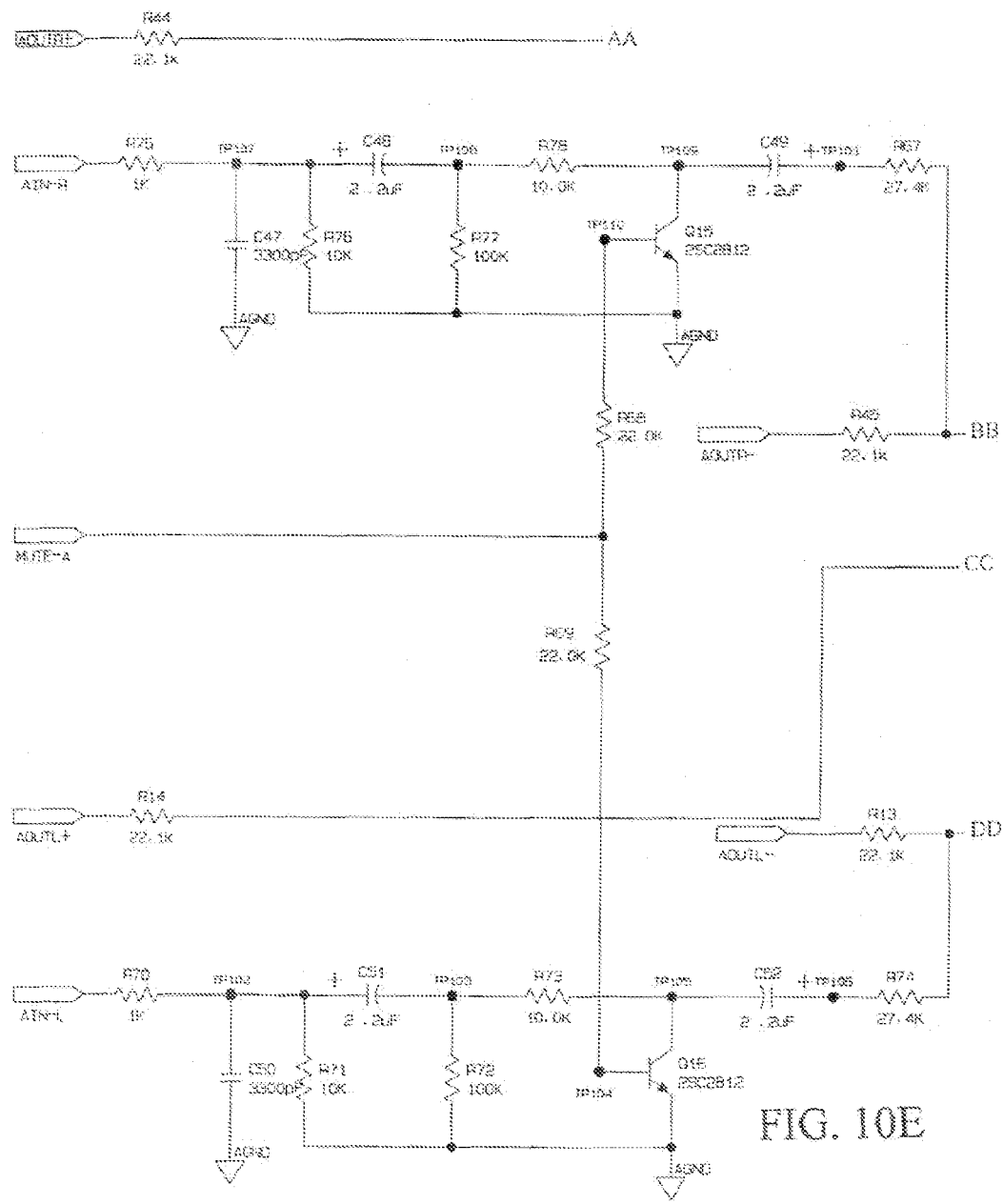
Figure 10F:
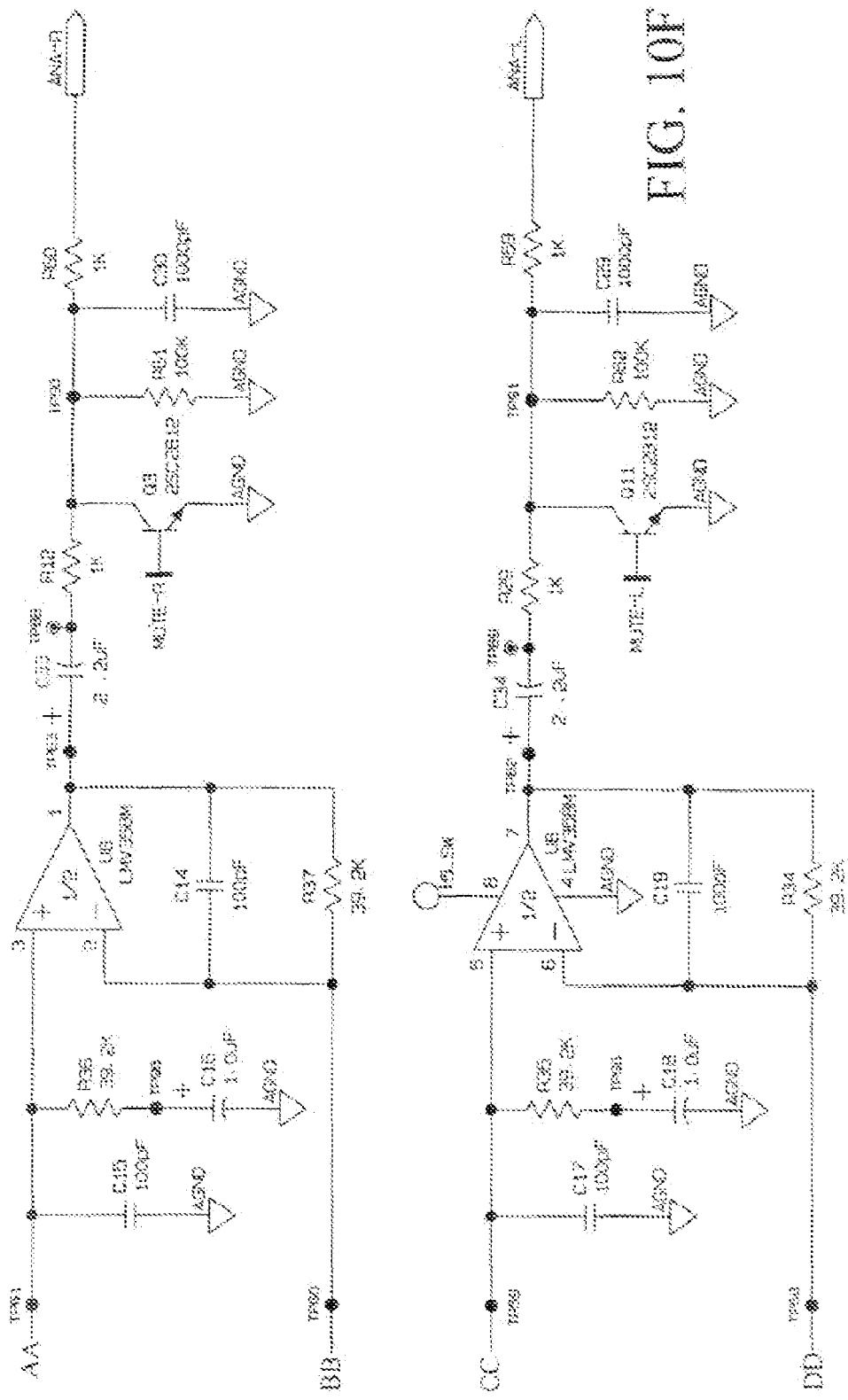

This may be conveniently done using the available selections region 90 (FIG. 6) and the various control input devices, including keyboard 44 or mouse 40 (FIGS. 1 and 2) radio control panel (FIG. 5), or the remote control device 17 (FIGS. 1, 2, and 8). The computer program running on computer 20 may provide for the user to enter a preferred subset category, or alternatively, may allow the user to sort, order or filter the entries in the available selections region. The input devices may then be used to highlight and select entries in the available selections region 90. In one embodiment, the tuning keys 128 of the control panel (FIG. 5), or the corresponding buttons 147 on remote control 17 are used to highlight and select entries in the available selections region. In this embodiment, pressing the tuning key 128 or 147 highlights the next entry in the available selections region 90. The tuning keys may also be used in the above manner even if the interface screen (FIG. 6) is not visible on the display, as may happen if the interface screen has been minimized or if the view of the interface screen is obscured by a graphical display generated by a software program. This aspect of the invention may also be used in audio systems which have no display associated with them.

In another embodiment, when the source category is broadcast radio, tuning keys 128 of the control panel (FIG. 5) and the corresponding buttons 147 on remote control 17 are used in the conventional manner, that is, to change the tuning frequency of AM/FM tuner 12.

Figures 9, 10:
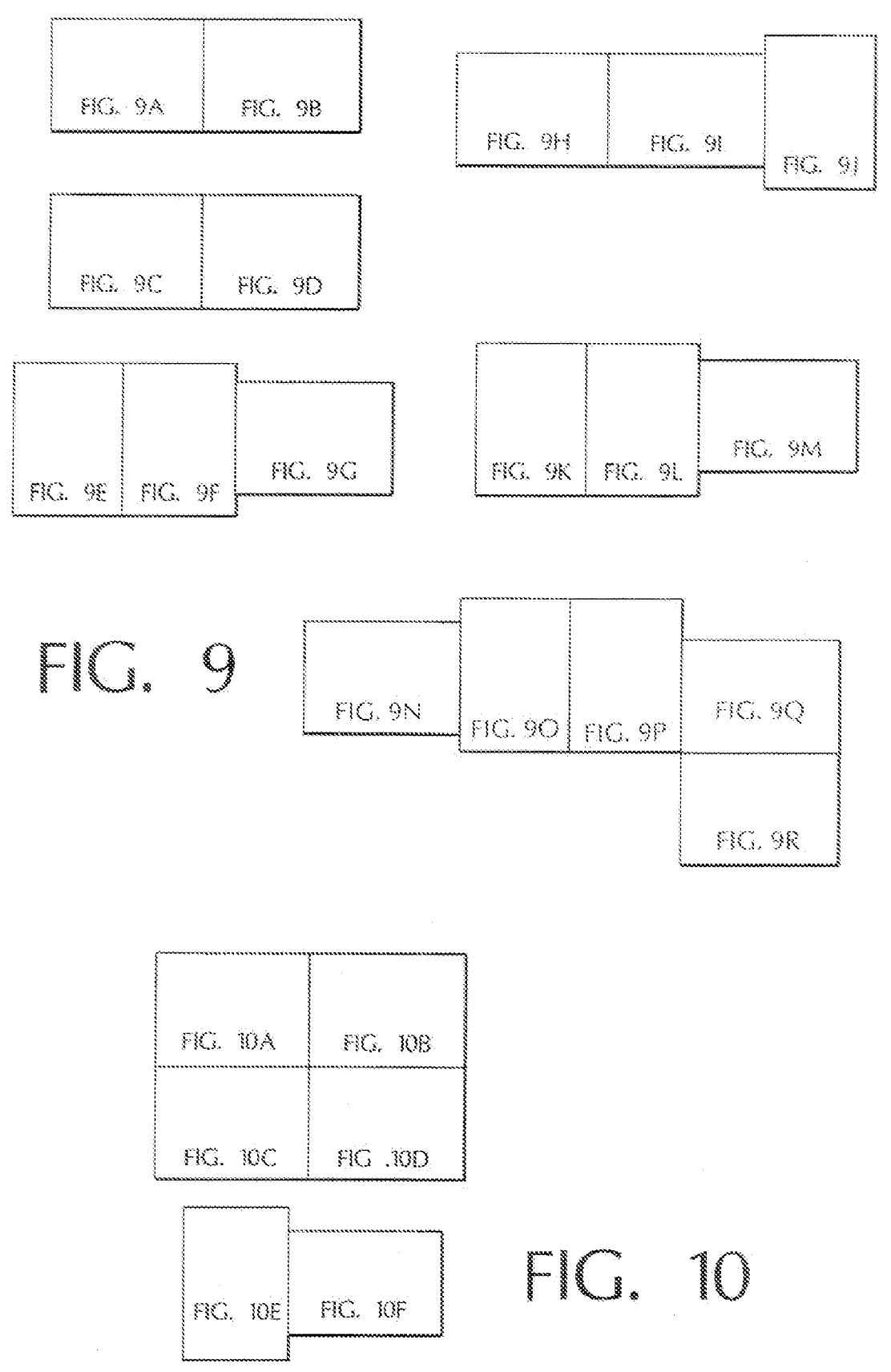

FIGS. 9A, 9B, 9C and 9D are schematic circuit diagrams of circuitry in a radio in an exemplary embodiment of the invention implementing AM-FM tuner 16, audio signal processing circuit 14 and control electronic circuitry 16 in the system of FIG. 2. FIG. 10 is a schematic circuit diagram of an exemplary embodiment of interface unit 54.

There is enclosed a CD-ROM that may be inserted into the D drive of a personal computer in an exemplary embodiment of the invention.

It is evident that those skilled in the art may make numerous modifications of and departures from the specific apparatus and techniques disclosed herein without departing from the invention concepts. Consequently, the invention is to be construed as limited only by the spirit and scope of the appended claims.

What is claimed is:

1. An audio reproduction system comprising:
   (i) an audio source device comprising:
      a storage device configured to store a plurality of music files, each music file including at least a first and second type of metadata that characterizes the music file; and
      a display for displaying a user interface configured to present a first assemblage of the plurality of music files in a first set groups according to the first type of metadata associated with the music files, and, in response to a user selection of a group in the first assemblage, present a second assemblage of the music files in the selected group, wherein the second assemblage presents the music files in the selected group in a second set of groups according to the second type of metadata associated with the music files in the selected group;
   (ii) an enclosure comprising:
      a powered speaker;
      an interface configured to operably couple the audio source device with the powered speaker; and
      control circuitry for receiving control signals; and
   (iii) a remote control configured to produce at least a first control signal that controls an operation of the audio source device, wherein the first control signal is received by the control circuitry and transmitted to the audio source device via the interface.

2. The audio reproduction system of claim 1 wherein the audio source device further comprises a processor and instructions stored on a computer-readable medium that when executed by the processor cause the processor to assemble the plurality of music files into the first set of groups based on the first type of metadata associated with each respective music file, and assemble the plurality of music files into the second set of groups based on the second type of metadata associated with each respective music file.

3. The audio reproduction system of claim 2 further including instructions that cause the processor to detect an addition of a new music file to the plurality of music files after assembling the plurality of music files into two or more groups, and in response to detection of a new music file, automatically updating the first and second set of groups with the new music file based on first and second type of metadata associated with the new music file.

4. The audio reproduction system of claim 1 wherein the first or second type of metadata comprise artist information.

5. The audio reproduction system of claim 1 wherein the first or second type of metadata comprise album information.

6. The audio reproduction system of claim 1 wherein the first or second type of metadata comprise composer information.

7. The audio reproduction system of claim 1 wherein the first or second type of metadata comprise information about music type.

8. The audio reproduction system of claim 1 wherein the storage device comprises a hard drive.

9. The audio reproduction system of claim 1 wherein the display device comprises a monitor.

10. The audio reproduction system of claim 1 wherein the user interface is further configured to present information about a source of audio information.

11. The audio reproduction system of claim 1 wherein the user interface is configured to present the first and second type of metadata associated with music files.

12. The audio reproduction system of claim 11 wherein the user interface is configured to permit a user to sort music files based on the presented metadata.

13. The audio reproduction system of claim 1 wherein the audio source device comprises a computer.

14. The audio reproduction system of claim 13 wherein the computer comprises a personal computer.

15. The audio reproduction system of claim 1 wherein the storage device comprises a hard drive.

16. The audio reproduction system of claim 1 wherein the interface comprises an electrical connector.

17. The audio reproduction system of claim 1 wherein the remote control is further configured to produce a second control signal that controls an operation of the powered speaker.

18. The audio reproduction system of claim 17 wherein the first control signal comprises a signal instructing the audio source device to skip to the next track and the second control signal comprises a volume control signal.

19. The audio reproduction system of claim 1 wherein the first control signal comprises a signal instructing the audio source device to skip to the next track.

20. The audio reproduction system of claim 1 wherein the enclosure further comprises a radio tuner.

21. The audio reproduction system of claim 1 wherein the interface comprises a physical interface configured to operably couple the audio source device with the powered speaker.

22. The audio reproduction system of claim 1 wherein the interface is further configured to removably couple the audio source device with the powered speaker.

23. The audio reproduction system of claim 1 wherein the first control signal comprises a digital signal when it is transmitted to the audio source device via the interface.

24. The audio reproduction system of claim 1, wherein the audio source device is configured to transmit an analog representations of the respective music files to the sound reproduction device via the interface.

25. An audio reproduction system comprising:
a sound reproduction device comprising at least one speaker;
an interface unit operably coupled to the sound reproduction device;
a music storage device configured to removably connect with the sound reproduction device via the interface unit, the music storage device comprising:
 a storage device configured to store a plurality of music files each including at least a first and second type of metadata characterizing the respective music files;
 a processor; and
 instructions stored on a computer-readable media that when executed, cause the processor to:
  assemble the plurality of music files into a first set of groups based on the first metadata associated with each respective music file;
  assemble the plurality of music files into a second set of groups based on the second metadata associated with each respective music file;
  detect an addition of a new music file to the plurality of music files after assembling the plurality of music files into two or more groups; and
  in response to detection of a new music file, automatically update the first and second set of groups with the new music file based on first and second type of
metadata associated with the new music file; and
a remote control device configured to transmit at least a first command and a second command to the sound reproduction device, wherein the first command is received at the sound reproduction device and controls a function of the sound reproduction device and the second command is received at the sound reproduction device and communicated to the music storage device via the interface and controls a function of the music storage device.

26. The audio reproduction system of claim 25 wherein the music storage device comprises a personal computer.

27. The audio reproduction system of claim 25 wherein the mass storage device is located within the music storage device.

28. The audio reproduction device of claim 25 wherein the sound reproduction device further comprises a radio tuner.

29. The audio reproduction device of claim 25 wherein the music storage device comprises circuitry for converting a music file to audible sound.

30. The audio reproduction device of claim 25 wherein the sound reproduction device further comprises a housing containing the one or more speakers, and the interface unit is physically integrated within said housing.

31. The audio reproduction device of claim 25 wherein the interface unit is physically connected to the sound reproduction device via a cable.

32. The audio reproduction device of claim 25 wherein the first type of metadata comprises one or more of the following: artist, composer, album, and type of music.

33. The audio reproduction system of claim 25 wherein the interface unit is configured to receive from the remote control the commands that control operation of the music storage device.

34. The audio reproduction system of claim 25 wherein the storage device is configured to receive from the remote control the commands that control operation of both the speaker and the music storage device.

35. An audio reproduction system comprising:
(i) a sound reproduction device comprising:
 an enclosure;
 a powered speaker mounted within the enclosure; and
 a radio tuner located within the enclosure;
(ii) an interface device operably coupled to the sound reproduction device;
(iii) an audio source device configured to removably connect to the sound reproduction device via the interface device, the audio source device comprising:
 a storage device configured to store a plurality of music files, each music file including at least a first and second type of metadata that characterizes the music file; and
 a display for displaying a user interface configured to present a first assemblage of the plurality of music files in a first set groups according to the first type of metadata associated with the music files, and, in response to a user selection of a group in the first assemblage, present a second assemblage of the music files in the selected group, wherein the second assemblage presents the music files in the selected group in a second set of groups according to the second type of metadata associated with the music files in the selected group; and
(iv) a remote control device configured to produce at least a first command and a second command, wherein the first command controls a function of the audio source device and the second command controls a function of the sound reproduction device.

36. The audio reproduction system of claim 35 wherein the interface device is configured to receive the second command from remote control device and transmit the received second command to the audio source device.

37. An audio reproduction system comprising:
(i) a sound reproduction device comprising:
   an enclosure;
   a powered speaker at least partially located within the enclosure; and
   an interface module at least partially integrated within the enclosure;
(ii) an audio source device configured to operably connect to the sound reproduction device via the interface module, the audio source device comprising:
   a storage device configured to store a plurality of music files, each music file including at least a first and second type of metadata that characterizes the music file; and
   a display for displaying a user interface configured to present a first assemblage of the plurality of music files in a first set groups according to the first type of metadata associated with the music files, and, in response to a user selection of a group in the first assemblage, present a second assemblage of the music files in the selected group, wherein the second assemblage presents the music files in the selected group in a second set of groups according to the second type of metadata associated with the music files in the selected group; and
(iii) a remote control device configured to produce both first command and a second command, wherein the first command controls a function of the audio source device and the second command controls a function of the sound reproduction device.

38. The audio reproduction system of claim 37 wherein the interface module is configured to provide a physical interface between the sound reproduction system and the audio source device.

39. The audio reproduction system of claim 38 wherein the first control signal comprises a signal instructing the audio source device to skip to the next track.

40. The audio reproduction system of claim 38 wherein the first control signal comprises a signal instructing the audio source device to skip to the next track and the second control signal comprises a volume control signal.

41. The audio reproduction system of claim 38 wherein the enclosure further comprises a radio tuner.

42. The audio reproduction system of claim 37 wherein the audio source device comprises a computer.

43. The audio reproduction system of claim 37 wherein the storage device comprises a hard drive.

* * * * *

US007277765C1

(12) INTER PARTES REEXAMINATION CERTIFICATE (1264th)
United States Patent
Beckmann et al.

(10) Number: US 7,277,765 C1
(45) Certificate Issued: May 11, 2016

(54) INTERACTIVE SOUND REPRODUCING

(75) Inventors: Paul E. Beckmann, Southborough, MA (US); Santiago Carvajal, West Newton, MA (US); Christopher H. Perry, Westborough, MA (US)

(73) Assignee: BOSE CORPORATION, Framingham, MA (US)

Reexamination Request:
No. 95/001,260, Dec. 4, 2009

Reexamination Certificate for:
Patent No.: 7,277,765
Issued: Oct. 2, 2007
Appl. No.: 09/689,337
Filed: Oct. 12, 2000

(51) Int. Cl.
*G06F 3/16* (2006.01)
*H04R 5/04* (2006.01)
*H04R 5/02* (2006.01)
*H04B 1/20* (2006.01)
*G10K 11/178* (2006.01)
*G06F 17/30* (2006.01)

(52) U.S. Cl.
CPC ............ *G06F 3/165* (2013.01); *G10K 11/1788* (2013.01); *H04B 1/20* (2013.01); *H04B 1/202* (2013.01); *H04R 5/02* (2013.01); *H04R 5/04* (2013.01); *G06F 17/30749* (2013.01)

(58) Field of Classification Search
USPC .......................................................... 700/94
See application file for complete search history.

(56) References Cited

To view the complete listing of prior art documents cited during the proceeding for Reexamination Control Number 95/001,260, please refer to the USPTO's public Patent Application Information Retrieval (PAIR) system under the Display References tab.

*Primary Examiner* — Mary Steelman

(57) ABSTRACT

An audio system attachable to a computer includes a sound reproduction device for producing audible sound from audio signals. The sound reproduction device includes a radio tuner and a powered speaker. The audio system further includes a connector for connecting the sound reproduction device with a computer. The computer provides audio signals from a plurality of sources, the sources including a computer CD player, digitally encoded computer files stored on the computer, and a computer network connected to the computer. The sound reproduction device further includes control buttons for controlling at least one of the computer CD player, the digitally encoded computer files and the computer network.

At the time of issuance and publication of this certificate, the patent remains subject to pending reissue application number 14/989,663 filed Jan. 6, 2016. The claim content of the patent may be subsequently revised if a reissue patent is issued from the reissue application.

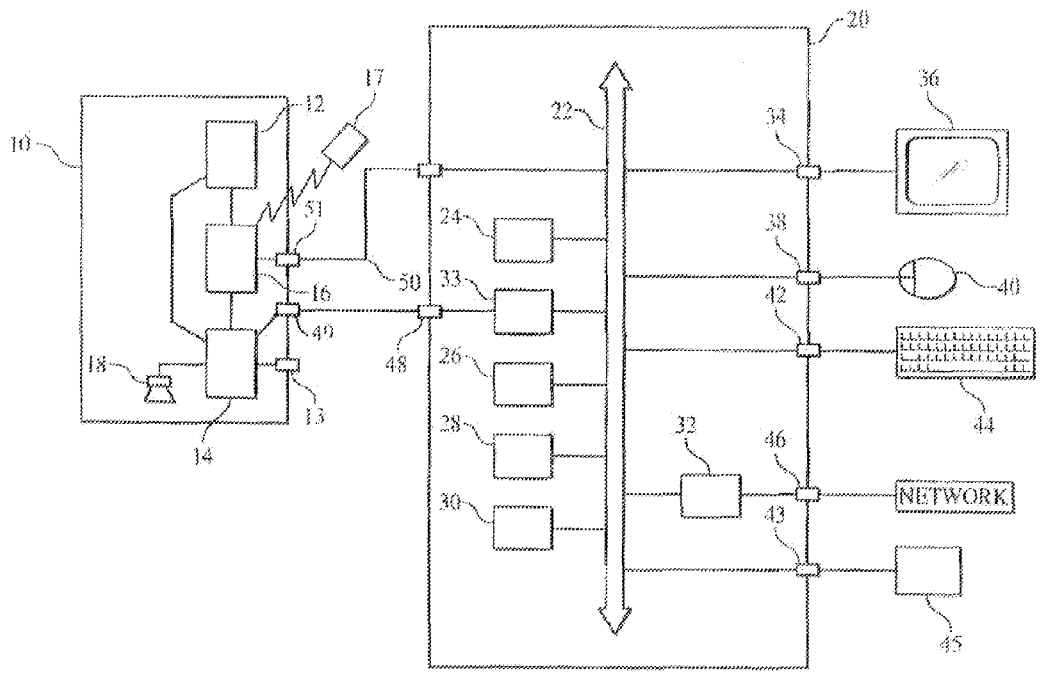

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-43 are cancelled.

\* \* \* \* \*